US008386479B2

(12) United States Patent
Safra et al.

(10) Patent No.: US 8,386,479 B2
(45) Date of Patent: Feb. 26, 2013

(54) ROUTING METHODS FOR MULTIPLE GEOGRAPHICAL ENTITIES

(75) Inventors: Eliyahu Safra, Redlads, CA (US); Yaron Kanza, Kibbutz Tzuba (IL); Yehoshua Sagiv, Jerusalem (IL); Yerach Doytsher, Raanana (IL)

(73) Assignees: University of Toronto, Toronto (CA); Technion Research & Development Foundation Ltd., Haifa (IL); Yissum Research Devolpment Company of the Hebrew University of Jerusalem Ltd., Jerusalem (IL)

( * ) Notice: Subject to any disclaimer, the term of this patent is extended or adjusted under 35 U.S.C. 154(b) by 0 days.

(21) Appl. No.: 12/667,797

(22) PCT Filed: Jul. 9, 2008

(86) PCT No.: PCT/IL2008/000945
§ 371 (c)(1),
(2), (4) Date: Nov. 3, 2010

(87) PCT Pub. No.: WO2009/007965
PCT Pub. Date: Jan. 15, 2009

(65) Prior Publication Data
US 2011/0040750 A1    Feb. 17, 2011

Related U.S. Application Data

(60) Provisional application No. 60/948,555, filed on Jul. 9, 2007.

(51) Int. Cl.
*G06F 17/30* (2006.01)
(52) U.S. Cl. ........................................................ 707/723
(58) Field of Classification Search .................. 707/722, 707/802
See application file for complete search history.

(56) References Cited

U.S. PATENT DOCUMENTS

| | | | | |
|---|---|---|---|---|
| 7,281,002 | B2 * | 10/2007 | Farrell ................................. | 1/1 |
| 2003/0074471 | A1 * | 4/2003 | Anderson et al. ............. | 709/245 |
| 2008/0052395 | A1 * | 2/2008 | Wright et al. ................. | 709/224 |
| 2009/0003713 | A1 * | 1/2009 | Gupta et al. .................. | 382/225 |
| 2009/0125225 | A1 * | 5/2009 | Hussain et al. ............... | 701/200 |
| 2009/0312945 | A1 * | 12/2009 | Sakamoto et al. ............ | 701/208 |
| 2012/0059584 | A1 * | 3/2012 | Nesbitt et al. ................. | 701/527 |

* cited by examiner

*Primary Examiner* — Belinda Xue
(74) *Attorney, Agent, or Firm* — The Law Office of Michael E. Kondoudis

(57) ABSTRACT

Routing method for computing routes over uncertain geospatial data whereby only upon visiting the geographic entities it can be determined whether the needed service or product is actually provided and is adequate. When dealing with uncertain data, the returned route may need to go via several entities of the same type. Another routing method consists of finding an efficient and effective route from a starting point to an ending point going trough a predetermined number of objects, wherein each object represents a geographical entity of a unique type, and each object is selected from a distinct set of similar objects.

10 Claims, 20 Drawing Sheets

Fig. 1

```
Greedy (D, φ_c, s)
Input: A dataset D with confidence values φ_c, and a start location s
Output: A route over D
 1: let π be an empty sequence
 2: CurrentLocation ← s
 3: NotVisited ← D
 4: while NotVisited ≠ ∅ do
 5:    let o be the object in NotVisited such that  φ_c(o) / distance(CurrentLocation,o)  =
          max{ φ_c(o') / distance(CurrentLocation,o') | o' ∈ NotVisited}
 6:    add o to π
 7:    remove o from NotVisited
 8:    let CurrentLocation be the location of o
 9: return π
```

Fig. 2

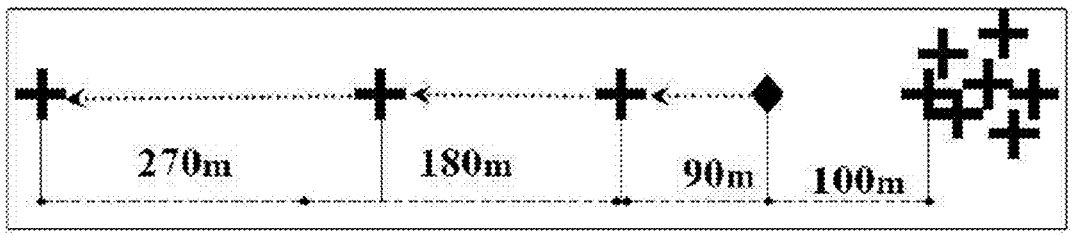

Fig. 3

$AAG\,(D, \varphi_c, s)$

Parameter: An accuracy parameter $\epsilon$
Input: A dataset $D$ with confidence values $\varphi_c$, and a start location $s$
Output: A route over $D$ 1: generate a weighted graph $G$ from $D$ and $\varphi_c$
2: generate a transition matrix $P$ from $G$
3: create a uniform distribution $X_1 = (\frac{1}{n}, \ldots, \frac{1}{n})$
4: $t \leftarrow 1$
5: while $\|P^{t+1}X_1 - P^t X_1\| \geq \epsilon$ do
6: $\quad t \leftarrow t + 1$
7: create from $P^t X_1$ a function $X^*$ that provides a value to each node
8: $\pi \leftarrow \text{Greedy}(D, X^*, s)$
9: return $\pi$

Fig. 4

```
k-EG (D, φ_c, s)
Parameter: The number k of correct objects to visit
Input: A dataset D with confidence values φ_c, and a start location s
Output: A route over D
 1:  K ← ∅
 2:  S ← {{o} | o ∈ D}
 3:  while S ≠ ∅ do
 4:     for each set S in S do
 5:        if k ≤ Σ_{o∈S} φ_c(o) then
 6:           add S to K
 7:           remove S from S
 8:        else
 9:           minLength ← ∞
10:           for each o ∈ D − S do
11:              let l_{S,o} be the length of the route created by a greedy algorithm for the
                 starting point s and the objects S ∪ {o}, based on merely distances,
                 without using confidence values (at each iteration the greedy adds to
                 the path the nearest object to the current location among the objects not
                 added so far)
12:              if l_{S,o} < minLength then
13:                 objToAdd ← o
14:                 minLength ← l_{S,o}
15:           add objToAdd to S
16:  minLength ← ∞
17:  chosenSet ← ∅
18:  for each S in K do
19:     let l_S be the length of the route created by a greedy algorithm for the starting
        point s and the objects of S, according to distance and without using the confi-
        dence values
20:     if l_S < minLength then
21:        chosenSet ← S
22:        minLength ← l_S
23:  let π be the route that starts at s and is generated by a greedy algorithm using only
     distances, over the objects of chosenSet
24:  complete π to include all the objects of D using the greedy algorithm as in Fig. 1
     (when choosing which object to add use the ratio of distance and confidence)
25:  return π
```

*Greedy Extension* $((s, t, Q_1, \ldots, Q_k), D)$

Input: Source location $s$, target location $t$, search queries $Q_1, \ldots, Q_k$, a dataset $D$
Output: A route starting at $s$, ending at $t$ and visiting at least one object from each answer to $Q_i$ over $D$ 1: for $i = 1$ to $k$ do
2:     $A_i \leftarrow Q_i(D)$
3: let $\pi = s, t$ be an initial sequence
4: $I \leftarrow \{1, \ldots, k\}$
5: $j \leftarrow 1$
6: while $I \neq \emptyset$ do
7:     let $U = \cup_{i \in I} A_i$
8:     find $o$ in $U$ such that $length(insert(\pi, o, j)) = \min\{length(insert(\pi, o', j)) \mid o' \in U\}$
9:     $\pi \leftarrow insert(\pi, o, j)$
10:    remove from $I$ the index $i'$ of the set $A_{i'}$ that contains $o$
11:    $j \leftarrow j + 1$
12: return $\pi$

Fig. 22

*Greedy Insertion* $((s, t, Q_1, \ldots, Q_k), D)$

Input: Source location $s$, target location $t$, search queries $Q_1, \ldots, Q_k$, a dataset $D$
Output: A route starting at $s$, ending at $t$ and visiting at least one object from each answer to $Q_i$ over $D$ 1: for $i = 1$ to $k$ do
2:     $A_i \leftarrow Q_i(D)$
3: let $\pi = s, t$ be an initial sequence
4: $I \leftarrow \{1, \ldots, k\}$
5: $i \leftarrow 1$
6: while $i \leq k$ do
7:     let $U = \cup_{i' \in I} A_{i'}$
8:     let $o, j$ be the object and the position such that $length(insert(\pi, o, j)) \leq length(insert(\pi, o', j'))$ for all $o'$ in $U$ and $1 \leq j' \leq i$
9:     $\pi \leftarrow insert(\pi, o, j)$
10:     remove from $I$ the index $i'$ of the set $A_{i'}$ that contains $o$
11:     $i \leftarrow i + 1$
12: return $\pi$

*Ascending from Shortest* $((s, t, Q_1, \ldots, Q_k), \ell, D)$

Input: Source location $s$, target location $t$, search queries $Q_1, \ldots, Q_k$, a distance limit $\ell$, a dataset $D$

Output: A route with length not exceeding $\ell$ and high minimal score, starting at $s$, ending at $t$ and visiting at least one object from each answer to $Q_i$ over $D$ 1: for $i = 1$ to $k$ do
2:    $A_i \leftarrow Q_i(D)$
3: compute the shortest route and let $\pi$ be the result sequence (e.g., using IFH)
4: if $length(\pi) > \ell$ then
5:    return $\emptyset$
6: $stop \leftarrow false$
7: repeat
8:    find the object $o$ with the lowest score in $\pi$
9:    $\pi' \leftarrow \pi - o$ (* $\pi'$ results by removing $o$ from $\pi$ *)
10:    find the set $A_i$ such that $o \in A_i$
11:    $M \leftarrow \{(o', j') \mid o' \in A_i \text{ and } score(o') > score(o) \text{ and } 1 \leq j' \leq k \text{ and } length(insert(\pi', o', j')) \leq \ell\}$
12:    if $M = \emptyset$ then
13:      $stop \leftarrow true$
14:    else
15:      find $(o'', j'')$ where $length(insert(\pi', o'', j'')) = \min\{length(insert(\pi', o', j')) \mid (o', j') \in M\}$
16:      $\pi \leftarrow insert(\pi', o'', j'')$
17: until $stop$
18: return $\pi$

Fig. 24

```
RMHR ((s, t, Q_1, ..., Q_k), ℓ, D)
Input: Source location s, target location t, search
queries Q_1, ..., Q_k, a distance limit ℓ, a dataset D
Output: A route with length not exceeding ℓ and high
minimal score, starting at s, ending at t and visiting at
least one object from each answer to Q_i over D
 1: for i = 1 to k do
 2:    A_i ← Q_i(D)
 3: U ← ∪_{i=1}^{k} A_i
 4: sort U according to object scores in a descending or-
    der
 5: T ← ∅
 6: for i = 1 to k do
 7:    find the object o_i with the highest score in A_i
 8:    T ← T ∪ {o_i}
 9:    remove o_i from U
10: while true do
11:    compute the shortest route π over s, t and the
       objects of T (e.g., using IFH)
12:    if length(π) ≤ ℓ then
13:       return π
14:    else if U = ∅ then
15:       return ∅
16:    else
17:       find in U the object o with the highest score,
          and move o from U to T
```

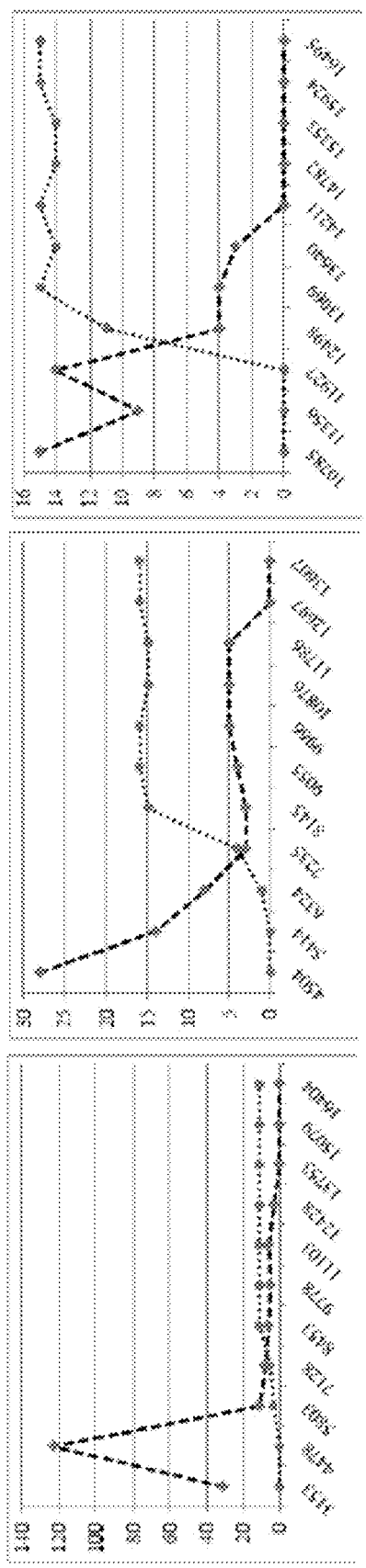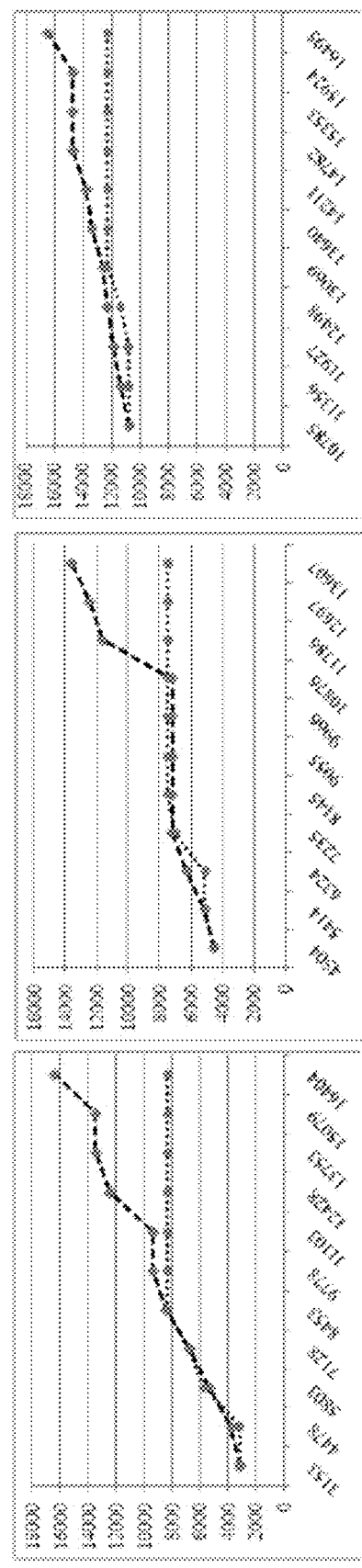

(b) Uneven part.

(a) Even partitioning

ROUTING METHODS FOR MULTIPLE GEOGRAPHICAL ENTITIES

CROSS-REFERENCE TO RELATED APPLICATIONS

This application is a National Stage of International Application No. PCT/IL2008/000945, filed Jul. 9, 2008, which claims the benefit of priority from U.S. Provisional Patent Application No. 60/948,555, filed Jul. 9, 2007.

FIELD OF THE INVENTION

The present invention relates to routing methods in general, and more particularly to finding an effective and efficient k-route over uncertain geo-spatial datasets and to finding effective routes that travel via relevant geographical entities.

1. BACKGROUND OF THE INVENTION

For several years now, online map services are widespread on the world-wide web, and the popularity of such services in hand-held devices is rapidly growing. Since map services are accessible to many novice users, they should allow easy formulation of queries that specify complex needs, such as a route search, i.e., finding a route that goes via some specified types of geographical entities.

In a traditional search over the world-wide web, users usually specify conditions in the form of a set of keywords. The result of a search is a ranked list of documents that satisfy the search conditions. The paradigm of a traditional search is, however, unsuitable for geographic search, because users need to actually visit the entities of the result. Traditional ranking methods ignore the location of the entities, the distance of entities from the location of the user and the distance of relevant entities from other relevant entities. Consequently, visiting geographical objects in an order that is the result of a traditional search may produce a long travel, whereas there is likely to be a much shorter route that also satisfies the user needs.

A paradigm of route search is introduced. In a route search, the user provides keywords that specify the entities she wants to visit and a target destination. The source location is either provided by the user or discovered automatically, e.g., using a GPS device. The goal is to find a route that starts at the source location, ends at the target location and goes through entities that are relevant to the search.

Example 1

Suppose a tourist, after landing at JFK airport in New York and renting a car, travels to her hotel. On the way she wants to visit a pharmacy, a coffee shop and a department store. A route-search application should allow the tourist to pose a suitable query (e.g., using the car-navigation system, her cellular phone or her laptop), and it should return a route starting at the parking lot of the car-rental agency, traveling through a pharmacy, a coffee shop and a department store, perhaps in a different order, and ending at the hotel. The route should be effective and should not make the tourist unnecessarily go back and forth in the city. Moreover, the entities on the route should match the search terms as much as possible in order to guarantee that they are indeed entities the tourist wants to visit.

There are many online map services on the web, for example Google Maps® (registered trademark of Google, Inc. of Mountain View, Calif., United States), Live Search Maps® (registered trademark of Microsoft, Inc. of Redmond, Wash., United States), MapQuest® (registered trademark of MapQuest, Inc. of Denver, Colo., United States) and Yahoo! Maps® (registered trademark of Yahoo!, Inc. of Sunnyvale, Calif., United States). These services support applications, such as viewing a map at different scales, searching for a geographical entity using keywords or an address, and finding a route between two given addresses. These services are, however, not effective for route-search tasks as the one in Example 1.

Example 2

When using a standard geographic search tool for the search in Example 1, the user will need to pose three different queries—one query to search for a pharmacy, another query to search for a coffee shop and a third query to search for a department store. Then, the user would need to choose an object from the result of each query and combine these results. Generating an effective route from these search results is not straightforward. Moreover, choosing the first object from the result of each query will not necessarily yield a short route.

When constructing a route, there are two conflicting goals. On one hand, the route should be as short as possible. On the other hand, the route should go via the most relevant entities. For instance, in many search scenarios, the following two routes will be different: the shortest route that goes via relevant objects and a (usually, longer) route that goes via the most relevant entities. The preferred route should be selected according to some chosen semantics.

We propose the following three semantics. In all of them, the geographical entities are categorized according to the search terms, and one entity from each category must be visited. For instance, in Example 1, there would be a set of pharmacy entities, a set of department-store entities and a set of coffee-shop entities. The route should include an entity from each set. Under the shortest-route semantics, the goal is to return the shortest route that goes via relevant entities. A second semantics is of finding the most-profitable route, which is the route that goes via the entities having the highest accumulative relevance, subject to the constraint that the length of the route should not exceed a given limit.

A third semantics is of computing the most-reliable route, which is a route whose length does not exceed a given limit, while trying to avoid, as much as possible, going via entities that have low relevancy. The goal in this semantics is to provide the best guarantee that all the visited entities will satisfy the user. The difference between the second and the third semantics is that in the second semantics, visiting a highly relevant entity compensates for visiting an entity whose relevancy is low. This is not the case under the third semantics where the quality of a route is determined by the entity with the lowest relevancy.

The most-profitable route is useful when scores that represent the relevancy of items, in a search result, are accumulative values, e.g., profits. For example, consider a person that wishes to distribute leaflets and has a dataset of geographical entities, each entity with a score representing the expected number of leaflets he will be able to distribute near that entity. In such cases, this person would probably consider the most-profitable route as a good route. However, usually scores in the results of a search are not accumulative. For such cases, the most-reliable route is more appropriate. For instance, choosing the most-profitable route for the search task of Example 1 may yield a route that goes via highly relevant coffee shop and pharmacy but where the relevancy of the third entity to the terms "department store" is low (e.g., when arriving at the place, the tourist may discover that the entity is not a department store). The goal of the most-reliable route is to avoid such cases. In most search systems, relevancy scores are not accumulative and therefore, we will focus on computing the most-reliable route.

One embodiment of the present invention relates to the problem of computing the most-profitable route. One approach for solving this problem is to construct the route from the result of a heuristic algorithm for some known optimization problem. In particular, this can be done by exploiting an algorithm for either the orienteering problem or the multiple-choice knapsack problem.

In order to provide route-search services, on the web or in devices with a limited computation power (such as cellular phones or car-navigation systems), it is crucial that the computation of queries will be efficient. Moreover, the amount of geographical data on the web is rapidly growing, hence, scalability also has a great importance. However, every one of the three semantics presented above is a generalization of the traveling-salesman problem (TSP). Since TSP is an NP-hard (nondeterministic polynomial-time hard) problem, it is unlikely that there is a polynomial-time algorithm for computing a route, under any of the three semantics. Therefore, the present invention discloses efficient heuristic algorithms for answering route-search queries.

Spatial datasets store objects that represent real-world geographical entities. When such datasets are uncertain, users who see only the information stored in the dataset cannot be certain whether objects correctly represent real-world entities. However, one can assume that users can verify the correctness of objects by using additional information or by visiting the geographical locations of these objects. In such datasets, each object has a correctness value of either true or false, and a confidence value; yet, users do not know the correctness values. Thus, when querying uncertain datasets, users consider the confidence of an object as the probability that the correctness value of the object is true. Applications over uncertain datasets should be able to utilize confidence values.

Some cases in which uncertain datasets occur are integration of heterogeneous sources, incorrect updates and inexact querying. We start by describing the first case.

When integrating two geo-spatial sources, the result consists of pairs and singletons. A pair is correct if it comprises two objects that represent the same real-world entity in the different sources. A singleton (i.e., a set that contains a single object) is correct if it represents a real-world entity that does not have a corresponding object in the other source.

In the absence of keys, integration can be done by using object locations [C. Beeri, Y. Doytsher, Y. Kanza, E. Safra, and Y. Sagiv. Finding corresponding objects when integrating several geo-spatial datasets. In ACM-GIS, pages 87-96, 2005; C. Beeri, Y. Kanza, E. Safra, and Y. Sagiv. Object fusion in geographic information systems. In VLDB, pages 816-827, 2004] or by using locations and additional attributes [E. Safra, Y. Kanza, Y. Sagiv, and Y. Doytsher. Integrating data from maps on the world-wide web. In *Proceedings of the 6th International Symposium on Web and Wireless Geographical Information Systems*, pages 180-191, 2006]. However, since locations are inaccurate, it is uncertain whether any given pair of the result is correct, that is, whether its two objects indeed represent the same real-world entity. Thus, the result of the integration is an uncertain spatial dataset.

Incorrect data manipulation can also yield uncertain datasets. The following example illustrates this.

Example 3

Consider a dataset of hotels, and suppose that no key constraint is imposed on this dataset. An incorrect insertion of data into the dataset may cause some hotel to appear twice with two different rates. In this case, users cannot know which object shows the correct rate of the hotel. Updates can cause a similar problem, for instance, when the name of some hotel is replaced with a name of a different hotel that already exists in the dataset.

Andritsos et. al. [P. Andritsos, A. Fuxman, and R. J. Miller. Clean answers over dirty databases: A probabilistic approach. In *Proceedings of the 22nd International Conference on Data Engineering*, 2006] have shown how to assign confidence values to objects in such cases.

Another important usage of uncertain datasets is representing the result of queries that contain an imprecise condition, namely, an adjective instead of a comparison between an attribute and a value. For example, find good restaurants, rather than find restaurants that have a rating of five stars. Additional examples are find a luxury hotel, find a popular tourist site, etc. The ability to cope with such queries is important in systems that are designed to answer requests for information formulated by non-expert users. Such queries are useful when providing tourist and municipal information to laymen who send their request through some limited device, such as a cellular phone.

When processing requests that are sent from a mobile device, one should bear in mind that the answer may depend on the location of the user.

Recently, location-based services have become a growing and important area in both research and commerce. Location-based services supply information through mobile devices, and the answer to a particular request depends on the location from which the request was sent, i.e., the location of the mobile device [K. Virrantaus, J. Markkula, A. Garmash, and Y. V. Terziyan. Developing GIS-supported location-based services. In *Proceedings of the 1st International Conference on Web Geographical Information Systems*, pages 423-432, 2001]. For instance, a user who asks about a nearby restaurant will get different answers in Times Square, Manhattan, and in Piccadilly Circle, London.

The present invention relates to a specific location-based service of finding the an efficient and effective k-route over an uncertain dataset. In this application, the input consists of an uncertain geo-spatial dataset, a location and some k. The output is a route that starts at the given location and goes via objects of the given dataset. The route is such that the expected distance from the starting point till visiting k correct objects is minimal. The following examples demonstrate the need for providing this service.

The term "efficient route" as defined herein means a route that is efficient from the point of view of its length. The user thus does not have to traverse a too long distance compared to other routing alternatives. The term "Effective route" as defined herein means that the route has the desired degree of certainty or score as to the quality of the visited geographical entities.

Example 4

Consider a user located in Times Square, Manhattan that is looking for a nearby inexpensive, good restaurant. The answer to this query can be a list of restaurants that presumably satisfy the request. However, it can also be an uncertain dataset that contains all the restaurants in Manhattan, such that the confidence value of each restaurant is correlated with the likelihood that the user will consider this restaurant as inexpensive and good. Suppose that the user wants to compare three good and inexpensive restaurants before deciding in which one to dine. The user may also want to walk as less as possible when visiting restaurants until she sees three that she likes. In such a case, the information system should find a 3-route starting at the location of the user in Times Square and going through restaurants in the dataset in a way that increases the likelihood to visit three inexpensive, good restaurants after a short walk.

There are many other scenarios in which an efficient and effective k-route can be useful. For instance, before leasing or buying a house, it may be reasonable to visit and compare several options, and to do that efficiently means to go through a short route. Also, for planning a tour in some city or in some country, it may be useful to use such an application.

Finding an efficient and effective k-route can be seen as the spatial version of computing top-k answers to a query. In many information-retrieval systems and also in some database applications, the result of a query contains only the top-k answers to the query. For instance, search engines on the World-Wide Web may present to users only the top 1,000 results out of the millions of answers to a query. In geographical applications, answers should not be ranked merely according to how well they match the query. Objects should be returned with a recommended route to take in order to visit them. Moreover, choosing such a route may have an influence on how the objects are ranked in the answer to the user. The efficient and effective k-route proposed by the invention is one way of doing it.

The problem of finding an efficient and effective k-route is a generalization of the traveling salesman problem (TSP). TSP (in the version where the salesman need not return to the origin) is the same as finding an efficient and effective k-route in the case where there is no uncertainty (i.e., all the objects have confidence equal to one) and k is equal to the number of objects in the dataset. Since TSP is known to be NP-hard (nondeterministic polynomial-time hard), one does not expect to find an efficient polynomial-time algorithm to an efficient and effective k-route problem. Thus, approximation algorithms are a good compromise.

The present invention discloses three novel approximation algorithms and explains the differences between them. The results of extensive experimentation are presented that compare the algorithms on different types of data. The experiments were conducted on both synthetic data and real-world data and show the trade-off between the quality of the approximation of each algorithm and its computation time.

SUMMARY OF THE INVENTION

It is an object of the present invention to propose efficient heuristic algorithms for computing route-search queries.

It is another object of the present invention to find an efficient and effective k-route.

In one aspect the present invention relates to a method for receiving a query regarding a plurality of geographical entities of different categories and responding with an efficient and effective route that travels through said plurality of geographical entities of different categories. For example, a user might specify as a query a coffee place, a modern art museum and a bar. Going through all available coffee places, modern art museums and bars the response will be a route that goes through a suggested coffee place, a modern art museum and a bar.

In a geographical search, a user may desire to visit one or more types of geographical entities in order to find a desired service or item. The user provides a search query and receives a result consisting of route traveling through geographical entities that satisfy the query. For example, the user may search for a restaurant that serves specific food; she may search for a car-rental agency; or she may search for a pharmacy where she could buy a specific medicine.

It is a further object of the present invention to provide an efficient route as an answer to a geographical query.

In another aspect, the present invention relates to computing routes over uncertain geo-spatial data whereby only upon visiting the geographic entities it can be determined whether the needed service or product is actually provided and is adequate. When dealing with uncertain data, the returned route may need to go via several entities of the same type.

For instance, in a search for a specific medicine, it may be desirable to return a route going through several pharmacies because the medicine may not be found in some pharmacies. Furthermore, visiting several entities may allow the user to compare prices, products, services or any other related attribute.

The present invention also relates to routes where several types of entities should be visited. For instance, the search query may require visiting a restaurant, a pharmacy and a car-rental agency. The answer should be a route that visits one entity of each specified type. Semantics for routes-search queries are disclosed in addition to algorithms for efficiently answering such queries.

The present invention relates to a method for finding an efficient and effective k-route over uncertain geo-spatial datasets, each geo-spatial dataset containing a plurality geo-spatial objects. Each object has a location, a confidence value and optionally one or more spatial or non-spatial attributes. A k-route is a path that traverses the geo-spatial objects starting at a given location and stopping after visiting k correct objects, the method comprising the steps of:

(i) identifying the geo-spatial object that has the best ratio of confidence to distance among the geo-spatial objects that have not yet been added to the k-route in previous iterations;

(ii) adding the object identified in step (i) to said k-route;

(iii) repeating steps (i) to (ii) until the sum of the confidences of the objects in the route reaches k.

In one embodiment of the present invention, the user wishes to find the route to a single geo-spatial object, and the method of the invention is used with a value of 1 for k.

In another embodiment of the present invention, all the geo-spatial objects may have the same confidence value. In this case, only the distance is taken into account when calculating the k-route.

In many cases, a user wishes to visit more than one location of the same type, for example, when looking for a wedding dress. In these cases, it is preferred to indicate to the user a store in the vicinity of other relevant stores in the assumption that if the user is interested in visiting several locations before taking an action, in this case buying or renting a dress. Thus in yet another embodiment of the present invention, the method of the invention further comprises the step of assigning an adjacency-aware value to each geo-spatial object. The adjacency-aware values are based on the distance of an object from other objects in the dataset, the confidence value of the object and the configuration of the objects.

In yet another embodiment of the present invention, the method of the invention further comprises the steps of: (i) first creating sets of objects such that the expected number of correct objects in each set is k; (ii) applying steps (i) to (iii) of the method for finding an efficient and effective k-route over uncertain geo-spatial datasets described above, on each created set; and (iii) choosing the set that generates the shortest route.

Alternatively, the value of k may not be known when calculating a k-route. In another variation, a user reports the correctness of each visited object, and the k-route is re-computed accordingly. The user thus provides the confidence value of each object, possibly after visiting the actual location in question.

The k-route can also be computed incrementally, such that each time a user is provided only with the next geo-spatial object.

In another aspect, the present invention relates to a method for finding an efficient and effective route from a starting point to an ending point going trough a predetermined number of objects, wherein each object represents a geographical entity of a unique type, and each object is selected from a distinct set of similar objects.

In one embodiment of the present invention, the method further comprises the steps of:
(i) calculating the first route segment from the starting point to the ending point;
(ii) selecting an object that yields the smallest increase in the length of the route, from a set that is not represented in the route, and adding said object before the ending point; and
(iii) repeating step (ii) until sets are represented in the route.

In another embodiment of the present invention, the method further comprises the steps of:
(i) calculating the first route segment from the starting point to the ending point;
(ii) selecting an object, from a set that is not represented in the route, that yields the smallest increase in the length of the route at a given segment and adding said object to said given segment of the route; and
(iii) repeating step (ii) until sets are represented in the route.

In yet another embodiment of the present invention, objects are added to the route in an ordered manner, selecting an object from the set with the least number of objects that is not yet represented in the route. It makes intuitive sense to start with the group with the least members, thus with the most limited choice, and gradually advance to bigger and bigger groups.

In a preferred embodiment of the present invention, each geographical entity is assigned a score (ranking score). Thus the route calculation can take into account not only the proximity of the geographical entity but also its score as an indication to the relevancy of the geographical entity to the user's request.

In a further embodiment of the present invention, a maximal allowed length value is specified for the route. For example, a user may request to plan a route going through a pharmacy, an Italian restaurant and a cinema (3 types of objects), but limit the overall route to not more than 3 kilometers.

In yet another embodiment of the present invention, objects are selected so that the minimal score among the objects of said route is the highest. Since the score is an indication to the quality of the object, it makes sense to select a route where a user has the least chances of being disappointed upon visiting a suggested geographical entity.

In yet a further embodiment of the present invention, the method further comprises the steps of:
(i) selecting the object with the highest score from each set and adding it to dataset T;
(ii) calculating the shortest route from dataset T;
(iii) adding an object with the next highest score to dataset T if the calculated route of (ii) exceeds the maximal allowed length value; and
(iv) repeating steps (ii) and (iii) until the new route length does not exceed the maximal, allowed route length.

In yet a further embodiment of the present invention, the method further comprises the steps of:
(i) calculating the efficient route;
(ii) identifying the object with the lowest score in the route;
(iii) examining all object candidates with a higher score to replace the object of (ii);
(iv) selecting a replacement candidate with the minimal increase to the route length, wherein the new route length does not exceed the maximal, allowed route length; and
(v) repeating steps (ii) to (iv) until none of the objects in the route can be replaced.

BRIEF DESCRIPTION OF THE DRAWINGS

FIG. 1 shows a pseudocode for the greedy algorithm.

FIG. 2 shows an example where the greedy algorithm does not perform well. The starting point is marked by a diamond. Objects are marked by crosses.

FIG. 3 shows a pseudocode for the Adjacency-Aware Greedy algorithm.

FIG. 4 shows a pseudocode for the k-Expectancy Grouping algorithm.

FIG. 21 shows a pseudocode for the Greedy Extension heuristic algorithm for answering queries, under the shortest-route semantics.

FIG. 22 shows a pseudocode for the Greedy Insertion heuristic algorithm for answering queries under the shortest-route semantics.

FIG. 23 shows a pseudocode for the Ascending from Shortest heuristic algorithm for answering queries under the most-reliable semantics.

FIG. 24 shows a pseudocode for the algorithm Route over the Most-Highly Ranked Objects, for answering queries under the most-reliable semantics.

FIG. 26A shows Case A (s=t), FIG. 26B shows Case B, FIG. 26C shows Case C (s is far from t).

FIGS. 27A-C are graphs showing the running time (in milliseconds) of RMHR (dark dashed line) and ASA (light dotted line) as a function of the distance limit. FIG. 27A shows Case A, FIG. 27B shows Case B, FIG. 27C shows Case C.

FIGS. 28A-C are graphs showing The length of the route constructed by RMHR (dark dashed line) and ASA (light dotted line) as a function of the distance limit. FIG. 28A shows Case A, FIG. 28B shows Case B, FIG. 28C shows Case C.

DETAILED DESCRIPTION OF THE INVENTION

Figure 5:
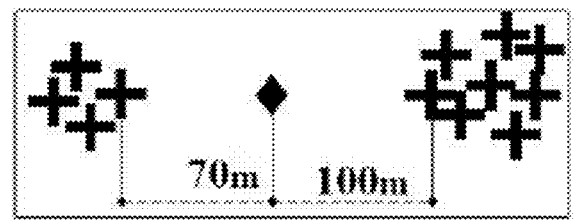
FIG. 5 shows an example where the AAG algorithm does not perform well. The starting point is marked by a diamond. Objects are marked by crosses.

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

2 Framework

In this section, we formally present our framework and the problem of finding an efficient and effective k-route over uncertain datasets, we also present the concept of route search.

Uncertain Geo-Spatial Datasets A geo-spatial dataset is a collection of geo-spatial objects. Each object has a location and may have additional spatial and non-spatial attributes. Height and shape are examples of spatial attributes. Address and name are examples of non-spatial attributes. We assume that locations are points and objects are disjoint, i.e., different objects have different locations. For objects that are represented by a polygonal shape and do not have a specified point location, we consider the center of mass of the polygonal shape to be the point location.

The distance between two objects is the Euclidean distance between their point locations. We denote the distance between two objects $o_1$ and $o_2$ by distance$(o_1, o_1)$. Similarly, if o is an object and l is a location, then distance(o, l) is the distance from o to l.

An uncertain geographical dataset is a pair $(D, \phi_c)$, where D is a geo-spatial dataset and $\phi_c: D \rightarrow [0, 1]$ is a function that maps each object of D to a value between 0 and 1, called confidence. An instance of $(D, \phi_c)$ is a pair $(D, \tau)$ where $\tau: D \rightarrow \{\text{true, false}\}$ is a function that maps objects of D to a correctness value, either true or false. For each uncertain dataset $(D, \phi_c)$, there are $2^{|D|}$ possible instances, where $|D|$ is the number of objects in D. We consider the confidence of an objects as an indication of how likely it is for the object to be correct, i.e., to be mapped to true by $\tau$. To each instance $I=(D, \tau)$, we assign a probability $P(I)$ according to the confidence values of the objects:

$$P((D,\tau)) = [\Pi_{\{o_i|\tau(o_i)=true\}} \phi_c(o_i)] \cdot [\Pi_{\{o_i|\tau(o_i)=false\}} (1-\phi_c(o_i))].$$

When computing a route over an uncertain data, it is not known what the actual instance is. Hence, the probabilities of possible instances should be taken into account.

Usually, users know only D and $\phi_c$ when querying or using uncertain data. However, when developing algorithms for uncertain data, it is important to test them on data for which $\tau$ is known in order to determine the quality of the results of each algorithm. Thus, the datasets in our experiments included full information about $\tau$.

Efficient and Effective k-Route Consider a dataset D with n objects $o_1, \ldots, o_n$. A complete route over D is a sequence $\rho = o_{i_1}, \ldots, o_{i_n}$ where $i_1, \ldots, i_n$ is some permutation of $1, \ldots, n$. The complete route $\rho$ provides an order for traversing the objects of D. Now, suppose that we are given an instance $I=(D, \tau)$, which includes $\tau$ in addition to D. Consider a traversal that starts at some given point s and visits the objects according to $\rho$. For each object o, we can count the number of correct objects and the distance until we get to o. Formally, we denote by correct$_\rho(o_{i_j})$ the number of correct objects among $o_{i_1}, \ldots, o_{i_j}$. That is, $$\text{correct}_\rho(o_{i_j}) = |\{o_{i_l} | 1 \leq l \leq j \text{ and } \tau(o_{i_l})=\text{true}\}|.$$

Also, we denote by distance$_\rho(s, o_{i_j})$ the distance of the path that starts at s and leads to $o_{i_j}$ according to $\rho$. That is, $$\text{distance}_\rho(s,o_{i_j}) = \text{distance}(s,o_{i_1}) + \Sigma_{l=1}^{j-1} \text{distance}(o_{i_l}, o_{i_{l+1}}).$$

Given an instance $I=(D, \tau)$ and a complete route $\rho = o_{i_1}, \ldots, o_{i_n}$ over D, a k-route is the shortest subsequence $o_{i_1}, \ldots, o_{i_j}$ such that correct$_\rho(o_{i_j})=k$; however, if such a subsequence does not exist (i.e., correct$_\rho(o_{i_n})<k$), then the k-route is $\rho$ itself. Intuitively, a k-route is a traversal that stops at the k-th correct object. We denote by k-distance(s, $\rho$, I) the distance of the k-route $o_{i_1}, \ldots, o_{i_j}$ when starting at s, that is, k-distance(s, $\rho$, I)=distance$_\rho$(s, $o_{i_j}$).

For an uncertain dataset, there can be many possible instances having k-routes with different lengths. Thus, we consider an expected length rather than an exact length. Given an uncertain dataset $(D, \phi_c)$, a start point s and a complete route $\rho$ over D, the expected length of a k-route is $$\Sigma_{I \text{ is an instance of } (D,\phi_c)} [P(I) \cdot k\text{-distance}(s,\rho,I)].$$

The efficient and effective k-route over an uncertain dataset $(D, \phi_c)$ is a complete route $\rho$ that has an expected length smaller or equal to the expected length of any other k-route over $(D, \phi_c)$. Our goal in this work is to provide algorithms that compute a good approximation to the efficient and effective k-route.

Assessing the Quality of the Result In this work, we present three approximation algorithms to the problem of finding an efficient and effective k-route. In order to assess the quality of the results of these algorithms, we compare the expected length of the k-routes that the different algorithms compute. An algorithm $A_1$ is considered better than algorithm $A_2$ with respect to an uncertain dataset $(D, \phi_c)$ and a starting point s, if the expected length of the k-route produced by $A_1$ is shorter than the expected length of the k-route produced by $A_2$. Given a digital map that contains D, algorithm $A_1$ is better than $A_2$ for (D, $\phi_c$) if the number of points s (of the map) for which $A_1$ is better than $A_2$ is greater than the number of points s for which $A_2$ is better than $A_1$.

Datasets and Search Queries 2.1 Geographical Datasets

In many scenarios, traveling from one object to another must be on a road and cannot be done in a straight line. In such cases, traversal is according to a road network. A road network is represented as a set of intersecting polygonal lines. The network location of an object o is the point on the network that is nearest to the actual location of o. Over networks, we assume that the distance between two objects is the length of the shortest path between their network locations. (For methods of computing distances over a road network, see the work of Samet et al. [H. Samet, J. Sankaranarayanan, and H. Alborzi. Scalable network distance browsing in spatial databases. In ACM SIGMOD, pages 43-54, 2008] and the work of Shahabi et al. [C. Shahabi, M. R. Kolandouzan, and M. Sharifzadeh. A road network embedding technique for k-nearest neighbor search in moving object databases. GeoInformatica, 7(3):255-273, 2003].)

2.2 Search Queries

Users specify what entities they would like to visit using search queries. A search query consists of a set of keywords and constraints on attributes. We represent a query as a pair Q=(W,C), where (1) W is a set of keywords, and (2) C is a set of constraints having the form A ◊ v, such that A is an attribute name, v is a value and ◊ is a comparison symbol among =, <, >, ≠, ≦ and ≧. For instance, Hotel, Wireless Internet Access, rank≧3, price≦100 specify that the user would like to go via a hotel that provides an Internet wireless connection, has a ranking of at least three starts and a rate that does not exceed $100.

For a search, we consider the textual component of an object to be the concatenation of the values in the non-spatial attributes of the objects. An object o satisfies a search query Q when at least one keyword of Q appears in its textual component and the constraints of Q are satisfied in the usual way. Each object that satisfies a query is given a ranking score (or score, for short). The score is a value between 0 and 1, and it indicates how relevant is o to the search. We denote the score of an object o by score(o).

There are different approaches for computing relevance scores for textual elements and a set of keywords, e.g., TF-IDF, Okapi BM25 [S. Jones, S. Walker, and S. Robertson. A probabilistic model of information retrieval: Development and comparative experiments (parts 1 and 2). Information Processing and Management, 36(6):779-840, 2000; S. Robertson, S. Walker, S. Jones, M. Hancock-Beaulieu, and M. Gatford. Okapi at trec-3. In Proc. of the Text REtrieval Conference (TREC-3), pages 109-126, Gaithersburg, USA, 1994] and others [G. Salton and M. McGill. Introduction to modern information retrieval. McGraw-Hill, 1983]. Route search can be defined with respect to search queries with a different syntax or a different semantics.

2.3 Route-Search Queries

In a route-search query, the user specifies a source location, a target location and the entities that the route should visit. We represent a route-search query as a triplet R=(s, t, Q), where s is a source location, t is a target location and Q is a set of search queries.

Example 3

Consider again the route-search task presented in Example 1. A suitable route-search query for this task should include (1) the location s of the parking lot of the car-rental agency, (2) the location t of the hotel, and (3) the following three search queries: $Q_1$={pharmacy}; $Q_2$={coffee shop}; and $Q_3$={department store}.

A pre-answer to a route-search query is a route that starts at s, ends at t and for each query Q in Q, goes via one object of the result of Q. That is, if $A_1, \ldots, A_k$ are the answers to the search queries of R, a route is a sequence s, $o_1, \ldots, o_k$, t, where $o_i \in A_i$ for $1 \leq i \leq k$. The length of such a route is the sum of the distances between adjacent objects, i.e., distance(s, $o_1$)+$\Sigma_{i=1}^{k-1}$ distance($o_i$, $o_{i+1}$)+distance($o_k$, t). The total score of the route is $\Sigma_{i=1}^{k}$ score($o_i$). The minimal score of the route is min{score($o_i$)|$1 \leq i \leq k$}. The answer to a route-search query is a pre-answer chosen according to a specific semantics.

When computing an answer to a route-search query, it is desirable that the total length of the route will be as small as possible. It is also desirable that the visited objects will have a ranking score as high as possible. There can be a conflict between these two goals. The route that travels via the objects with the highest ranking scores may be long while the shortest route, among those satisfying the route-search constraints, will go via objects with low ranking scores. Furthermore, having a total high score for a route does not guarantee that all the objects on the route have a high score, yet, having a high minimal score may be desirable in some scenarios. Thus, we present three semantics for route-search queries.

2.3.1 Semantics for Route-Search Queries

When presenting the semantics, we assume that D is a dataset, R=(s, t, {Q1, ..., Qk}) is a given route-search query, and A1=Q1(D), ..., Ak=Qk(D) are the answers to the search queries of R, over D.

Shortest Route (SR). Under the shortest-route semantics, the answer is the shortest pre-answer.

Most-Profitable Route (MPR). Under the most-profitable semantics, a distance limit l is given. The answer is the pre-answer that has the highest total score among the pre-answers whose length does not exceed the distance limit l.

Most-Reliable Route (MRR). Under the most-reliable semantics, a distance limit l is given. The answer is the pre-answer with the highest minimal score among the pre-answers whose length does not exceed the distance limit l.

2.3.2 Comparison to Known Optimization Problems

Next, we compare the proposed semantics to optimization problems that exists in the literature.

The problem of finding the shortest route is a version of the generalized traveling-salesman problem (GTSP). In GTSP, given a partition of the nodes of a weighted graph to k clusters, the goal is to find the least-cost cycle passing through each cluster exactly once. Thus, GTSP is similar to computing the shortest route when the source and the target have the same location. Yet, note that our problem is limited in the following two aspects. We assume that there is an edge between every two nodes and that the weights on the edges define a metric space (i.e., the weights satisfy the triangle inequality).

GTSP has been studied extensively over the years. It was introduced by Henry-Labordere [A. Henry-Labordere. The record balancing problem—a dynamic programming solution of a generalized traveling salesman problem. Revue Francaise D Informatique DeRecherche Operationnelle, 2:43-49, 1969], Saksena [J. P. Saskena. Mathematical model for scheduling clients through welfare agencies. J. of the Canadian Operational Research Society, 8:185-200, 1970] and Srivastava et al. [S. S. Sarivastava, S. Kumar, R. C. Garg, and P. Sen. Generalized traveling salesman problem through n sets of nodes. Journal of the Canadian Operational Research Society, 7:97-101, 1969] for problems that arise in computer design and in routing. Many approaches were proposed for solving GTSP, including dynamic programming [A. G. Chentsov and L. N. Korotayeva. The dynamic programming method in the generalized traveling salesman problem. Mathematical and Computer Modeling, 25(1):93-105, 1997], integer programming [G. Laporte and Y. Nobert. Generalized traveling salesman problem through n-sets of nodes—an integer programming approach. INFOR, 21(1):61-75, 1983], Lagrangian relexation [G. Laporte, H. Mercure, and Y. Nobert. Finding the shortest hamiltonian circuit through n clusters: A lagrangian approach. Congressus Numerantium, 48:277-290, 1985; C. E. Noon and J. C. Bean. A lagrangian based approach for the asymmetric generalized traveling salesman problem. Operations Research, 39(4):623-632, 1991], branch-and-cut [M. Fischetti, J. J. Salazar-Gonz'alez, and P. Toth. A branch-and-cut algorithm for the symmetric generalized traveling salesman problem. Operations Research, 45(3):378-394, 1997], genetic algorithms [L. V. Snyder and M. S. Daskin. A random-key genetic algorithm for the generalized traveling salesman problem. European Journal of Operational research, 174:38-53, 2006] and transforming the problem into a standard traveling salesman problem [Y. Lien, E. Ma, and B. W. S. Wah. Transformation of the generalized traveling-salesman problem into the standard traveling-salesman problem. Information Sciences, 74(1-2): 177-189, 1993].

The algorithms of the invention are different from the above by giving precedence to efficiency over the quality of the results.

The problem of finding the most-profitable route has some similarity to the orienteering problem. In the orienteering problem, the input consists of a distance limit, a start location and a set of objects where each object has a score. The problem is to compute a route that (1) starts at the given starting location, (2) have a length that does not exceed the given distance limit and (3) goes via objects whose total score is maximal. The orienteering problem has been studied extensively [I. Chao, B. Golden, and E. Wasil. The team orienteering problem. European Journal of Operational Research, 88:464-474, 1996; B. Golden, L. Levy, and R. Vohra. The orienteering problem. Naval Research Logistics, 34:307-318, 1987] and several heuristic algorithms [I. Chao, B. Golden, and E. Wasil. A fast and effective heuristic for the orienteering problem. European Journal of Operational Research, 88(3): 475-489, 1996; B. Golden, Q. Wang, and L. Liu. A multifaceted heuristic for the orienteering problem. Naval Research Logistics, 35:359-366, 1988; P. Keller. Algorithms to solve the orienteering problem: A comparison. European Journal of Operational Research, 41:224-231, 1989; A. Leifer and M. Rosenwein. Strong linear programming relaxations for the orienteering problem. European Journal of Operational Research, 73:517-523, 1994; T. Tsiligirides. Heuristic methods applied to orienteering. Journal of the Operational Research Society, 35(9):797-809, 1984] and approximation algorithms [R. Ramesh, Y. Yoon, and M. Karwan. An optimal algorithm for the orienteering tour problem. ORSA Journal on Computing, 4(2):155-165, 1992] were proposed for it.

There are three main differences between orienteering and the problem of computing the most-profitable route.

1. In MPR, the objects are divided into sets (the sets are the answers to the queries) and an object from each set must be visited. In the orienteering problem, objects differ only in their location and score.

2. In MPR, exactly k objects must be visited, where k is the number of search queries in the route-search query. The number of objects in the answer to the orienteering problem is not known in advance.

3. There is always an answer to the orienteering problem (a route that does not include any object is a possible answer), whereas MPR is not always satisfiable.

Because of these differences, there is no simple way of using heuristic algorithms for the orienteering problem to solve MPR.

The problem of the most-profitable route also has some similarity to the multiple-choice knapsack problem. In the multiple-choice knapsack problem, there are k sets of objects $N_1, \ldots, N_k$. Each object $o \in N_i$ has an associated profit and a weight. The objective is to choose exactly one item from each set $N_i$, such that the total profit of the chosen items is maximized while their total weight does not exceed a given capacity c. The problem has been studies from many different perspectives and several heuristics were suggested for it [R. Armstrong, D. Kung, P. Sinha, and A. Zoltners. A computational study of a multiple-choice knapsack algorithm. ACM Transactions on Mathematical Software, 9:184-198, 1983; M. Dyer. An o(n) algorithm for the multiple-choice knapsack linear program. Mathematical Programming, 29:57-63, 1984; M. Dyer, N. Kayal, and J. Walker. A branch and bound algorithm for solving the multiple choice knapsack problem. Journal of Computational and Applied Mathematics, 11:231-249, 1984; D. Pisinger. A minimal algorithm for the multiple-choice knapsack problem. European Journal of Operational Research, 83(2):394-410, 1995; P. Sinha and A. Zoltners. The multiple-choice knapsack problem. Operations Research, 27(3):503-515, 1979; E. Zemel. An o(n) algorithm for the linear multiple choice knapsack problem and related problems. Information Processing Letters, 18:123-128, 1984].

The difference between the multiple-choice knapsack problem and MPR is that in the first, the weights of items are part of the input and do not change. Thus, when choosing an item, the total weight is increased by an amount that is independent of the other chosen items. In the most-profitable route problem, when we construct a route by adding new objects one by one, the increase in the length of the route caused by a newly added object depends on (its distances from) the preceding and the succeeding objects. So, for instance, the same objects in different orders may produce routes with different lengths.

The three semantics that we consider in this paper are a generalization of the traveling-salesman problem (TSP). In TSP, the goal is to find the shortest path that starts at a given location, ends at a given location and goes via all the objects. It is easy to show that computing route-search queries under either one of the three semantics is (at least) as hard as TSP.

3 Algorithms

In this section, we present three novel approximation algorithms for the problem of finding an efficient and effective k-route. We use the following notation when presenting the algorithms. We denote by $(D, \phi_c)$ the given uncertain dataset and by $o_1, \ldots, o_n$ the objects of D. We denote by s the location where the traversal should start. The result of the algorithms is a sequence $o_{i_1}, \ldots, o_{i_n}$ that defines a complete route.

Since TSP is a NP-hard problem, computing a route, under any of the proposed semantics, is NP-hard. Hence, assuming P≠NP, there is no polynomial-time algorithm for answering route-search queries and, thus, in this section we present heuristic algorithms for query answering.

When considering heuristic algorithms, in many cases there is a tradeoff between the efficiency of the computation and the quality of the results. Intuitively, a heuristic algorithm that examines many possible solutions will, in most cases, provide more accurate results than a heuristic algorithm that examines only a few possible solutions; however, the first algorithm will probably be less efficient than the second.

Algorithms for online services should be highly efficient. Many users will not be willing to wait for an answer more than several seconds. Thus, our goal is to provide algorithms that have time complexity that is linear or close to linear, in the size of the input.

Throughout this section, we use the following notations. We denote by $R=(s, i, Q)$ the route-search query. We denote by D the dataset on which R is computed. By l we denote the distance limit, when relevant.

3.1 The Greedy Algorithm

In the greedy algorithm, a route is constructed iteratively. Intuitively, in each iteration, the algorithm adds (to the sequence) the object that has the best ratio of confidence to distance among the objects that have not yet been added in previous iterations. The algorithm is presented in FIG. 1. Note that when choosing which object to add, while constructing the route, objects with high confidence are preferred over objects with low confidence and near objects are preferred over far objects.

The greedy algorithm is simple and efficient. No preprocessing is required and it has $O(|D|^2)$ time complexity. It usually provides a good approximation of an efficient and effective k-route in the following two cases. First, when k is very small. In particular, this is true for k=1. Secondly, when the objects of D are uniformly distributed and there is no correlation between confidence values and locations. Intuitively, in such cases, there is no preferred direction for the first leg of the traversal (which starts at s). Hence, the initial direction chosen by the greedy algorithm is as good as any other direction, and the produced route will have an expected distance close to the optimal.

When k is large and the distribution of either the objects or their confidences is not homogeneous, the greedy algorithm is not likely to provide good results. The following example illustrates a problematic behavior of the greedy algorithm.

Example 5

FIG. 2 shows a dataset that has a cluster of objects on the right side, and three objects with growing distances between them on the left side. Suppose that all the objects have the same confidence value. Given the starting location marked by a diamond, the route computed by the greedy algorithm will first go to the three objects on the left instead of going to the cluster on the right. For k=4, for instance, it is better to start the route by going to objects in the cluster on the right side.

3.2 The Adjacency-Aware Greedy Algorithm

Dealing with clusters of objects is important in many real-world scenarios. For example, in many cities, hotels are grouped near airports or tourist sites. Restaurants are usually located in the city center, near tourist sites and in the business district. Similarly, other utilities, such as shops or municipal buildings, are usually grouped together rather than being uniformly dispersed all over the city.

When a given dataset contains clusters of objects, a good heuristic is to give precedence to points that are in a cluster over points that are not in a cluster. This, however, is not done by the greedy algorithm, as shown in Example 5. The Adjacency-Aware Greedy Algorithm (AAG) improves the greedy algorithm by preferring objects that are surrounded by many near objects, especially if the near objects have high confidence values. This is done by means of assigning values to objects as follows.

The adjacency-aware value given to an object should be based not only on the distance of the other objects and their confidence values, but also on their configuration. For example, we should prefer an object that has a neighboring cluster of four objects, within a distance of 100 meters, over an object that has four neighbors, all of them at a distance of 100 meters but in four different directions.

In order to compute a value that is adjacency aware, we represent the dataset as a weighted graph and compute, for each object, a value that is the probability of reaching this object in a random walk on the graph. The weights on the graph edges are according to the distance between objects and the confidence values. An object that has many near neighbors has a higher probability to be visited in a random walk than an object that does not have near neighbors. Furthermore, an increase in the value of a node increases the values of its neighboring nodes for the following reason. If a node has a high probability to be visited in a random walk, this increases the likelihood of visiting the near neighbors of that node. Hence, the values of objects are affected by the configuration of the dataset.

Now, we formally define the weighted graph and show how to compute the probability of reaching a node by a random walk on this graph. Given the uncertain dataset $(D, \phi_c)$, we generate a weighted graph $G=(V, E, w)$, where the set of nodes V consists of all the objects in D, the set of edges E is D×D, i.e., there is an edge in G between every two nodes, and w is a function that maps each edge $e=(o_1, o_2)$ of E, where $o_1 \neq o_2$, to a weight $$w(e) = \frac{\varphi_a(o_2)}{\text{distance}(o_1, o_2)}.$$

For each object o, we define $w((o, o))=0$. A random walk over G is a stochastic process that chooses the next node to visit as follows. If we are at some node v, we randomly choose an outgoing edge of v. The probability of choosing an edge is proportional to its weight. The random walk creates a sequence $v_1, v_2, \ldots, v_t, \ldots$ of nodes. Since the walk is random, the node $v_t$ that is visited after t steps can be any node of G—each node with a different probability. We denote by $X_t$ the probability distribution over V of being at each node after t steps. We represent $X_t$ as a vector of probabilities of length $|D|$. That is, $X_t[i]$ is the probability to be at node $o_i$ after t steps.

The random walk is a memory-less process, that is, each step depends only on the last state. In other words, the probability of choosing an outgoing edge for making the next step is independent of the path that led to the current node. Hence, it is a Markov chain, which means that the random walk can be described using an n×n transition matrix P, such that $X_{t+1}=PX_t$ holds for every t (note that n is the number of objects in D). We denote by $P_{ij}$ the element in the ith column and the jth row of P. The element $P_{ij}$ is the probability to move from node $o_i$ to node $o_j$. Since the choice of edges is according to their weights, we define P as follows.

$$P_{ij} = \frac{w(o_i, o_j)}{\sum_{j'=1}^{n} w(o_i, o_{j'})}$$

Note that $\Sigma_{i=1}^{n} P_{ij}=1$ holds for every row j.

The transition matrix P defines an irreducible and aperiodic Markov chain. (Intuitively, irreducible means that from each node there is a non-zero probability to reach any other node, since the graph is connected; aperiodic means that for each node, 1 is the greatest common divisor of the lengths of all paths from this node to itself, since the graph is not bipartite.) So, given an initial uniform distribution $$X_1 = \left(\frac{1}{n}, \ldots, \frac{1}{n}\right),$$

we have that $P^t X_1 \to X^s$ as $t \to \infty$, where $X^s$ is a stationary distribution, that is, $PX^s = X^s$. For each i, the distribution $X^s$ gives the probability to be at $o_i$ in a random walk on G.

The AAG algorithm computes the stationary distribution $X^s$ and then applies the greedy algorithm where $X^s$ replaces $\phi_c$. The algorithm is presented in FIG. 3. Computing $X^s$ can be done as a preprocessing step. Thus, given a user request with a specific location, the time complexity of computing a route is the same as the time complexity of the greedy algorithm.

Our experiments show that the AAG algorithm improves the greedy algorithm. However, AAG has the disadvantage that the probability distribution Xs must be computed before computing a route, and hence AAG is less efficient than the greedy algorithm for datasets that change frequently. AAG also suffers from the following two problems.

1. AAG ignores k when computing the route. For instance, consider the case that is depicted in FIG. 5, assuming that all the objects have the same confidence. There is a small cluster on the left side of the starting point and a larger cluster on the right side of the starting point. The smaller cluster is closer to the starting point than the larger cluster. For large values of k, it is better to go to the bigger cluster first. However, for small values of k, going to the near (and smaller) cluster may be a better approach. In AAG, the same path is returned for all values of k.

2. A second problem is that by going directly to points in a cluster, there may be points on the way to the cluster, such that visiting them would not increase the distance of the route and yet, in the AAG method, such points are not always visited.

Our third method solves the above problems.

3.3 The k-Expectancy Grouping Algorithm

We now present the third method, namely, the k-Expectancy Grouping (k-EG) algorithm. Differently from the previous methods, the route generated by this algorithm depends not only on the dataset and the starting point, but also on the value of k. The k-EG algorithm consists of two steps. The first creates sets of objects such that the expected number of correct objects in each one is k. The second step applies the greedy algorithm to each one of these sets, and chooses the set for which the greedy algorithm generates the shortest route.

The k-EG algorithm is shown in FIG. 4. In the first part of the algorithm, sets of objects are generated and inserted into K. The sets in K are constructed so that the sum of confidence values, of the objects in each set, is greater than k. This means that for the sets in K, the average number of correct objects is at least k. Initially, K is empty.

The algorithm uses S to store sets that are eventually moved to K. Initially, for each object o in D, the set $\{o\}$ is in S. Then, we iteratively extend the sets in S by adding one object at a time, as described below. When a set has (for the first time) a confidence sum that is at least k, it is moved to K. In order to extend a set S of S by one object, we examine all the objects o of D that are not yet in S. For each object o, we compute a route that starts at s and traverses the objects of $S \cup \{o\}$. This route is computed by a greedy algorithm that uses ordinary distances (rather then the ratio of the confidence to the distance) in order to decide which node should be visited next. The object o for which the constructed route is the shortest is the one that is added to S.

After constructing the sets (Lines 1-15), we choose the one that has the shortest route (Lines 16-22). Then, a route is created from the chosen set by applying the greedy algorithm with ordinary distances. After traversing all the objects of the chosen set, we continue the route by visiting all the remaining objects of D, but now we apply the greedy algorithm that uses the ratio of the confidence to the distance.

In general, k-EG has $O(n^5)$ time complexity, where n is the number of objects in D. To see why this is true, note that initially there are n sets in S. Since the number of sets in S does not grow, there are at most n sets in S during the entire run of the algorithm. Also, each set contains at most n objects. Every set can be extended at most n times, each time by choosing an object from a set of at most n possible objects. So, there are at most $n^2$ times of considering whether to add a certain object to a certain set, which means no more than $n^3$ times of computing a route using a greedy algorithm, for all the n sets. Since for each set S the greedy algorithm has $O(|S|^2)$ runtime, the total time is $O(n^5)$.

In practice, the sets in S are expected to have a size that is much smaller than n. It is reasonable to assume that in practical cases the sets of S (and hence, also the sets in D will have O(k) size. If we consider, for instance, the case where all the objects in D have confidence values greater than 0.5, then every set in S must contain at most 2 k objects. Under the assumption that sets in S have O(k) size, the time complexity of the algorithm is $O(n^2 k^3)$. When k is constant, we actually get $O(n^2)$ time complexity.

Three optimizations are available to improve on the k-EG algorithm, namely optGreedy, optRemove and optBB.

1. optGreedy—in the beginning of the algorithm run first the greedy algorithm and generate its route cGreedy. We will denote cGrredy(l) as the length of the route of the greedy algorithm until the sum of the confidences reach 1. Now, for each k, object o where distance(start, o)>cGreedy(k) is not considered for addition to the route. Note that since the search is incremental, meaning we first generate the groups of k=1, then the groups of k=2, etc', this optimization is significant even for large k values.

2. optRemove—remove identical groups, i.e. groups that contain identical set of objects. optRemove uses two supporting data structures:
   a. Sorted array of the sums of the indexes of the objects in each group.
   b. Bit array of the object in each group.

Using these data structures we check if two groups are identical in the following way: in a pass over the first array the sum of the indexes in the group is identical we check in the bit array if these groups are actually identical. If yes, one of the groups is removed.

3. optBB—for each group the bounding box (BB for short) is saved. In each step we increase the BB by the maximal of two values:
   a. The maximal interval between two objects in the route between the group that was generated so far.
   b. The distance from the last object in the route so far to the nearest neighbor (that is not yet in the group)

Now, only objects within the updated BB are considered for adding to the group.

3.3 Algorithms for Shortest Route

In this section, we present three variants of a greedy algorithm for the shortest-route problem. These algorithms are simple and our focus is on their efficient implementation.

Before presenting the algorithms, we introduce some notations. Consider a sequence of objects $\pi$. With a slight abuse of notation, we also consider $\pi$ as the set of the objects it contains. By indexes$(\pi)=\{i | \pi \cup A_i \neq \emptyset\}$ we denote the indexes of the sets that have a representative in π. By π[j] we denote the object in the j-th position of π, e.g., for π=s, o₁, t, it holds that π[2]=o₁. We denote by insert(π, o, j) the sequence that is created by inserting the object o into π, after the object in position j and before the object in position j+1.

3.4.1 Greedy Extension

The Greedy Extension Algorithm (GExt), presented in FIG. 21, is a greedy algorithm for the shortest-route problem. Given a route-search query R and a dataset D, GExt evaluates the search queries of R over D and then constructs a route by greedily inserting objects at the end of the sequence. Each insertion is of the object that has the smallest effect on the length of the route.

In GExt we construct a route iteratively, starting with the sequence s, t. In each iteration, we insert an object into the last segment of the sequence. That is, given the initial sequence s, t, we add an object between s and t. In later iterations, the sequence is of the form s, o₁, . . . , o_m, t(m≧1) and we insert an object between o_m and t. In each iteration, we add to the sequence π an object from a set $A_i$, such that i∉indexes(π). The added object is the one that yields the smallest increase in length(π).

In GExt, there are k iterations. In each iteration, we examine at most n possible extensions to the constructed sequence, where n in the size of the dataset D. Thus, GExt has linear-time complexity.

Proposition 1. Greedy Extension has O(k|D|) time complexity, where k is the number of search queries and |D| is the size of the dataset over which R is computed.

We can decrease the number of objects being examined in each iteration by using a grid index (mesh). In a grid index, the given area is partitioned into squares and for each square, the index contains an entry that stores references to the objects located in that square.

We use the index by applying a two-step retrieval process. In the first step, we find an object near the interval where an object should be inserted. Then, we verify that the inserted object is the one that yields the smallest increase in the length of the route.

Consider the sequence s, o₁, . . . , o_m, t. We need to insert an object between o_m and t. First, we build a buffer around the line that connects o_m and t. The size of the buffer is chosen so that the expected number of objects in its area, from each set $A_i$, will be constant. Thus, suppose that S is the whole area of the map and the objects of D (and of each set $A_i$) are distributed uniformly in S. Let $$d = \frac{\min\{|A_i| \mid 1 \le i \le k\}}{S}$$

be the density of objects in S, and suppose that the minimum is obtained for $A_h$ (i.e., when i=h).

Let l be the distance between o_m and t. In an area of size 1/d, the expected number of objects from $A_h$ will be 1, and the expected number of objects from every other set among $A_1, \ldots, A_n$ will be some constant greater than 1. The buffer we construct is the area $S_x$ containing all the points whose distance from the line that connects o_m and t is not greater than x, where x is determined as follows. The size of the area $S_x$ is $$l \cdot 2x + 2\left(\frac{1}{2}\pi x^2\right).$$

In order to construct $S_x$ so that its area will be equal to 1/d we choose x to be $$x = \frac{\sqrt{l^2 + \frac{\pi}{d}} - l}{\pi}.$$

Using the grid index, we retrieve the objects in the area $S_x$ and find the object o' whose addition causes the smallest increase in the length of the sequence. (If we cannot find a suitable object in $S_x$, we increase the size of the search area by adding 1/d to it, i.e., replacing 1/d with 2/d when computing x. We continue increasing the search area, till we find a suitable object.)

In the second step of the retrieval, we check whether the object o' that was found above is indeed the one that causes the smallest increase in the length of the sequence. We do it by examining the elliptic area that contains all the points p, such that distance(o_m, p)+distance(p, t)≦distance(o_m, o')+distance (o', t). We retrieve the objects in this area using the index, and examine whether one of them should be added to the sequence instead of o'. It is easy to see that for objects outside of this area, adding them to the sequence will yield an increase in the length that is greater than the increase caused by inserting o'. Furthermore, the examined area is smaller than 2x(l+ 2x), so the expected number of objects in it is bounded by a constant. Consequently, in each iteration of GExt, we examine a constant number of objects, so the time complexity of each step is a function of the number of index entries we examine, which is usually much smaller than |D|.

3.4.2 The Greedy-Insertion Algorithm

In GExt, each extension is by adding an object to the last segment of the sequence. This approach helps keeping the algorithm efficient; however, in many cases after constructing part of the route, we may discover that for some set $A_i$, the best position to insert any object of $A_i$ into the sequence is not in the last segment. Thus, in the Greedy-Insertion Algorithm, we allow insertion of objects into any segment of the sequence.

The Greedy Insertion (GIns), presented in FIG. 22, is similar to GExt, except for the following difference. Instead of inserting objects only into the last segment of the constructed sequence, GIns allows insertion of objects into any segment. That is, given a sequence s, o₁, . . . , o_m, t, GIns inserts the object that yields the smallest increase in the length of the route, where the insertion can be between any two elements of the sequence, i.e., between s and o₁, between $o_i$ and $o_{i+1}$, or between o_m and t.

In each iteration of GIns, we examine at most |D| objects and for each object, at most k possible segments are considered as candidates where the object can be inserted. This provides the following complexity.

Proposition 2. Greedy Insertion has O(k²|D|) time complexity, where k is the number of search queries and |D| is the size of the dataset over which R is computed.

For boosting the efficiency of the computation, we use a grid index in the same way we used it in GExt. In each iteration, we first construct a buffer having a width x around the route constructed in the previous iteration. (The width x is calculated as for GExt, where l is the sum of lengths of all the segments of the sequence.) We retrieve the objects of the grid cells that intersect the buffer, and we find the best candidate o' and position i for the insertion of o' in position i. Then, for every pair of objects $o_j$ and $o_{j+1}$ that are adjacent in the sequence prior to the insertion of o', we consider the elliptic area containing all the points whose distance from the two objects $o_j$ and $o_{j+1}$ does not exceed distance($o_i$, o')+distance (o', $o_{i+1}$) (where o' was inserted between the objects $o_i$ and $o_{i+1}$ that are in positions i and i+1 of the sequence prior to the insertion). As earlier, we check whether any object in this elliptic area should be inserted between $o_j$ and $o_{j+1}$ instead of inserting o' between $o_i$ and $o_{i+1}$.

3.4.3 The Infrequent-First Heuristic

The sets $A_1, \ldots, A_k$ can be of different size. So, if a set $A_i$ is much larger than a set $A_j$ and the objects of the sets are distributed approximately uniformly, then at a random point there is a greater chance of finding a near object of $A_i$ than a near object of $A_j$. Similarly, there is a higher chance of finding an object of $A_i$ near a partially created route than of finding there an object of $A_j$.

In an ordinary run, GExt and GIns are expected to add objects of large sets before adding objects of smaller sets. The intuition behind the Infrequent-First Heuristic (IFH) is to reverse that order of insertion and start by inserting objects from small sets, since such objects tend to be infrequent and may not exist in adjacency to a partially created route In IFH, we sort the sets $A_1, \ldots, A_k$ in a descending order according to their size. Let $A_{j_1}, \ldots, A_{j_k}$ be such an order, i.e., for every $1 \leq i \leq i' \leq k$, we have $|A_{j_i}| \leq |S_{j_{i'}}|$. Then, we apply the algorithm GIns with the following change. In each iteration i, the inserted object is chosen from the set $A_{j_i}$ rather than from the union of several sets.

IFH is expected to be slightly more efficient than GIns, since in each iteration we examine a smaller set of objects. The sorting of the sets has a complexity of O(m log in), so when m is much smaller than |D|, it has an insignificant influence on the running time.

3.5 Algorithms for Most Reliable Route

In this section, we present two algorithms for the most-reliable route problem. One algorithm works in a bottom-up fashion by starting with the shortest route and improving it iteratively. The second algorithm works in a top-down fashion. It starts with a small set of objects and extends this set as long as it is possible to build a route whose length is smaller than the given distance limit. Next, we describe these algorithms more precisely.

3.5.1 Ascending from Shortest

The Ascending-from-Shortest Algorithm (ASA), presented in FIG. 23, is a heuristic algorithm for MRR. It starts by computing the shortest route, e.g., using one of the algorithms previously presented. It then applies an iterative sequence of improvement steps. In each step, it finds the object o of the route with the smallest score. Then, it examines all the possible candidates to replace o. We denote by replace ($\rho$, o, o') the path that is created by removing an object o from a sequence $\rho$ and inserting o' into the position where the increase in the length is the smallest.

Suppose that $o \in A_i$ and the current route is $\rho$. Then, a candidate to replace o is an object o' from $A_i$ such that (1) score(o)<score(o'), and (2) length(replace($\rho$, o, o'))$\leq$l (recall that l is the given limit distance). The algorithm replaces o by the candidate object that causes the smallest increase in the length of the route.

The algorithm stops when for the object with the lowest score, there are no candidates to replace it. Note that each replacement increases the minimal score of the route.

For analyzing the complexity of the algorithm, we note that it comprises two steps. The first step is of generating a shortest route. The time complexity of this step depends on the algorithm that is used. As previously shown, we can use a heuristic algorithm with O($k^2$|D|) time complexity for this computation.

The second step is an iterative process of improving the minimal score. It has at most |D| iterations. This is because in each iteration an object is replaced, and the algorithm never adds to the route an object that has been previously removed. In each iteration, there are at most |D| objects to examine, and for each object we consider k possible segments in which this object can be inserted. Consequently, the complexity of ASA is as follows.

Proposition 3. The Ascending-from-Shortest heuristic algorithm has O(k|D|(k+|D|)) time complexity.

In order to increase the efficiency of the algorithm, we reduce the number of objects being examined in each step by removing objects that cannot affect the result. When the algorithm starts, we remove from the sets $A_1, \ldots, A_k$ all the objects o such that distance(s, o)+distance(o, t)>l. A second reduction is done during the run of the algorithm. In each iteration, we compute l'=l−length($\pi'$). We then, consider only objects o, such that there are two adjacent objects in $\pi'$, say $o_1$ and $o_2$, for which distance($o_1$, o)+distance(o, $o_2$)$\leq$l'. We do not extend $\pi'$ by objects that do not satisfy this condition.

3.5.2 A Route Over the Most-Highly Ranked Objects

The algorithm Route over the Most-Highly Ranked Objects (RMHR) tacklesMRR in a top-down fashion. The algorithm is presented in FIG. 24. In the algorithm, we examine sets of highly-ranked objects. We define T $\subset$ D as a set of highly-ranked objects if for every object $o_r \in T$ and every object $o_d \in D \setminus T$, it holds that score($o_r$)$\geq$score($o_d$). We search for a set T of highly-ranked objects that is minimal in the following sense: There is a route $\pi$ over objects of T that satisfies length($\pi$)$\leq$l and the other conditions (i.e., starting at s, ending in t and going via one object of each set among $A_1, \ldots, A_n$), but such a route does not exist over any subset T' $\subset$ T of highly-ranked objects.

We search for the minimal set of highly-ranked objects by sorting the objects of each set $A_i$ in a descending order according to their score. Initially, we add to T the object with the highest score for each $A_i$. If we find a route over T whose length is smaller than or equal to l, we return this route. Otherwise, we add to T the object that has the highest score among the objects that are not in T. We stop when we find a route whose length is smaller than l or when there are no more objects that we can add to T.

RMHR employs a heuristic algorithm for computing the shortest route. However, when using an exact algorithm for computing the shortest route, RMHR computes an optimal solution to the most-reliable route problem.

Proposition 4. Let R be a route-search query under the most-reliable semantics. When RMHR uses an exact algorithm for computing the shortest route, it correctly computes an optimal answer to R if there is one.

For improving the efficiency of RMHR, we use the following three optimizations.

1. Initially, we discard all the objects o of D such that distance(s, o)+distance(o, t)>l, since such objects do not affect the result.

2. In the first insertion of objects to T (after Line 9 in FIG. 24), if o is the object with the smallest score in T, then we can move from U to T any object that has a score greater than or equal to score(o).

3. Finding the set T can be carried out in the form of a binary search. After having all the relevant objects sorted in the queue U, we partition U into two sets. Let The set that contains the $$\frac{1}{2}|U|$$

objects in U with the highest score. If we can compute over T a route whose length does not exceed l, we let T be the set that contains the $$\frac{1}{4}|U|$$

objects in U with the highest score. Otherwise, we take T to be the $$\frac{3}{4}|U|$$

objects in U with the highest score. We continue this way (adding or removing $$\frac{1}{2^i}|U$$

objects in each step i), till we find the minimal set of highly-ranked objects.

If we use the binary-search approach, we get $\log_2 |D|$ iterations in RMHR and, thus, the complexity is as follows.

Proposition 5. If RMHR employs an $O(k^2|D|)$-time algorithm for finding the shortest route, then RMHR runs in $O(k^2|D| \log |D|)$ time.

4 Experiments

Experiments Regarding k-Route for Uncertain Data

In this section, we describe the results of extensive experiments on both real-world data and synthetically-generated data. The goal of our experiments was to compare the three methods presented in Sections 3.1, 3.2 and 3.3, over data with varying levels of object spread and different distributions of confidence values.

4.1 Tests on Synthetic Data

Figure 6:
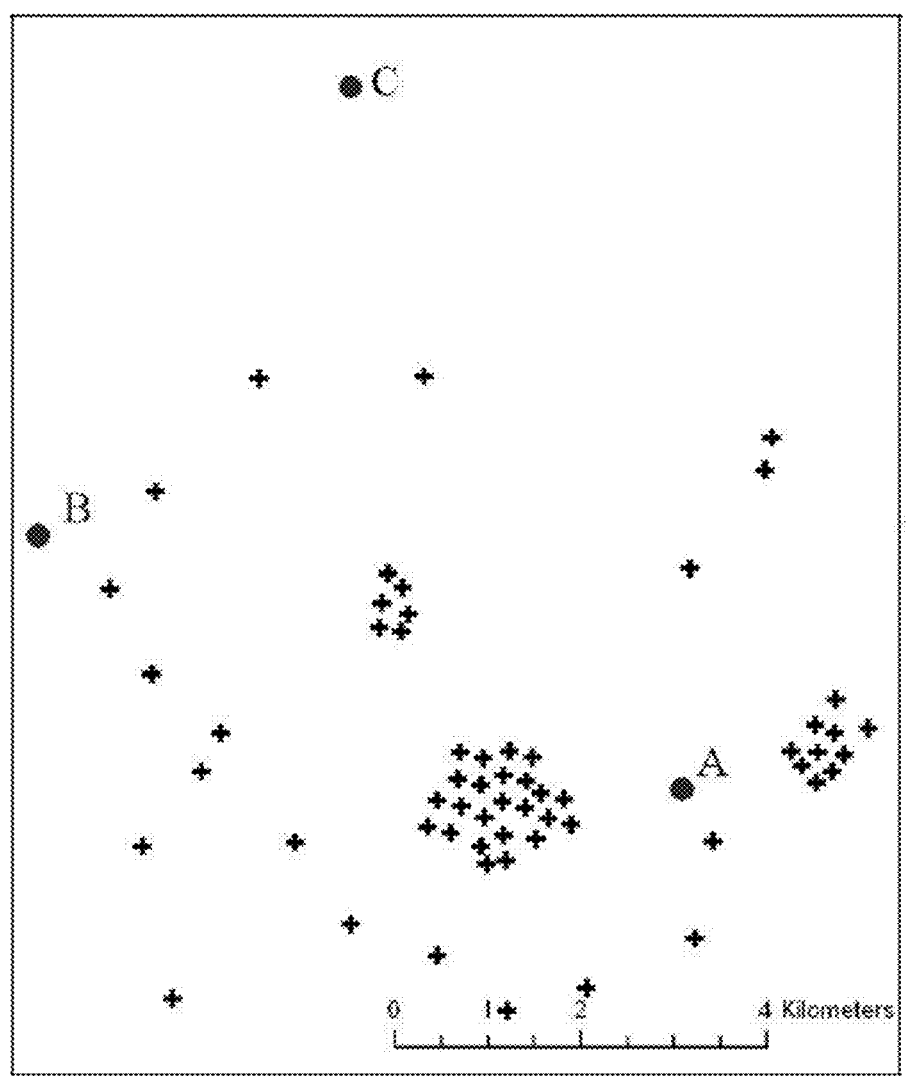
FIG. 6 is an example of a synthetic dataset.

We used synthetic datasets to test the differences between our algorithms. One of the synthetic datasets on which we conducted experiments is depicted in FIG. 6. In this figure, objects are marked by crosses. Potential starting points are marked by circles and have a letter (A, B or C) beside the circle to designate the point. The confidence values were chosen randomly according to a Gaussian distribution (normal distribution) with mean 0.7 and standard deviation 0.1. We do not show the confidence values in FIG. 6 because in some parts of the figure, objects are too dense for writing visible numbers beside them.

For estimating the expected distance of a route P over some given dataset $(D, \phi_c)$, when testing the quality of some algorithm, we generated 100 instances of $(D, \phi_c)$ and computed the average distance of a k-route over these instances. That is, for every given dataset $(D, \phi_c)$ we generated 100 instances $(D, \tau_1), \ldots, (D, \tau_{100})$ where each $\tau_i$ was the result of randomly choosing truth values $\tau_i(o_1), \ldots, \tau_i(o_n)$ such that in each choice, $\tau_i(o_j)$ was chosen as true with probability $\phi_c(o_j)$ and as false with probability $1-\phi_c(o_j)$. We then computed the distances $d_1, \ldots, d_{100}$, where $d_i$ is the length of the route from the starting point to the kth correct object when traversing $(D, \tau_i)$ according to P. We consider the average $(\Sigma_{i=1}^{100} d_i)/100$ as the expected distance of P over $(D, \phi_c)$.

Figure 8:
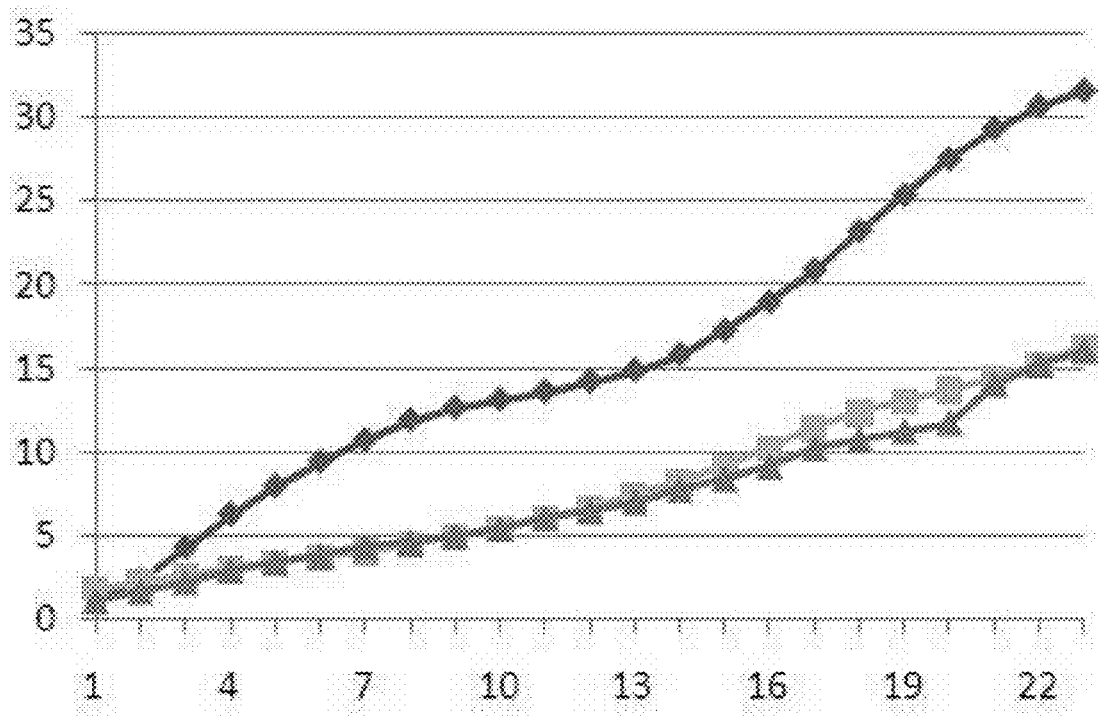
FIG. 8 shows the results of the algorithms of the invention when computing a route over the dataset of FIG. 6, given Starting-Point A.
Figure 9:
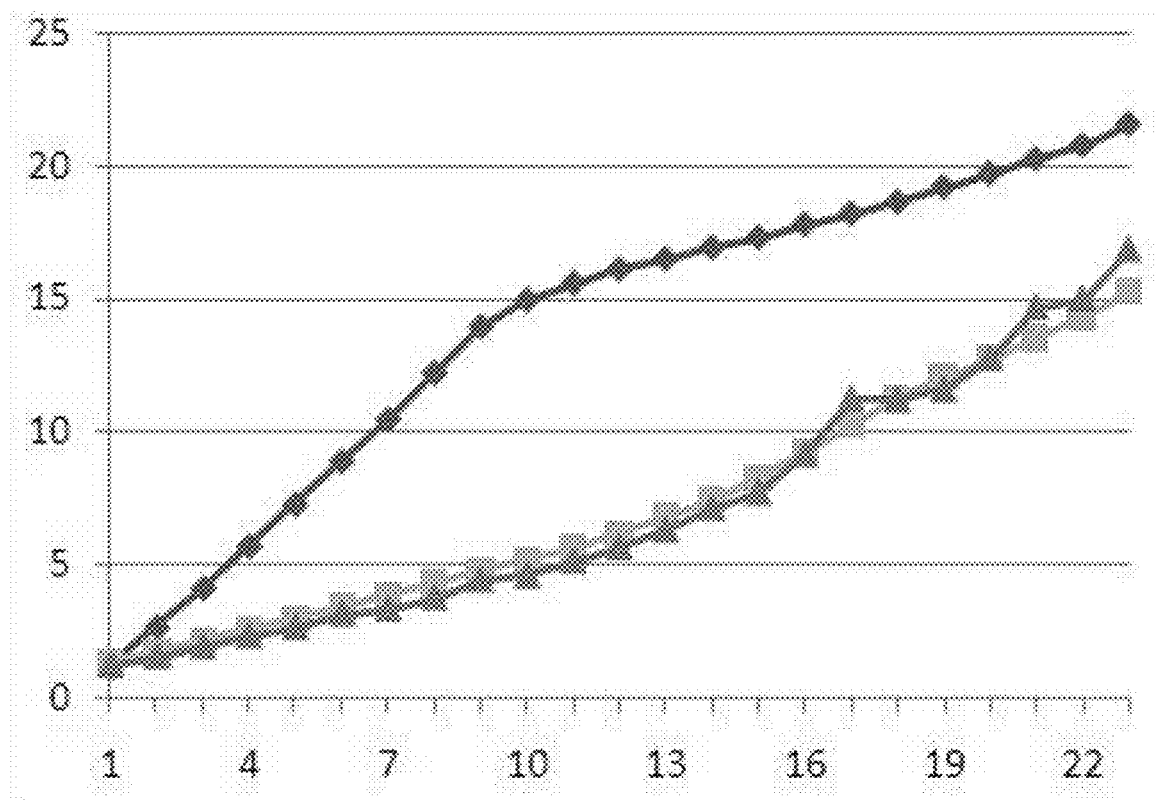
FIG. 9 shows the results of the algorithms of the invention when computing a route over the dataset of FIG. 6, given Starting-Point B.

FIG. 8 shows the results of our algorithms when computing a route over the dataset of FIG. 6, given Starting-Point A. The graph in this figure shows the expected k-distance, of the routes computed by the algorithms, as a function of k. The results of the greedy algorithm are presented by diamonds. For AAG, the results are depicted by squares, and for k-EG, the results are depicted by triangles. The graph shows that for small k values (k=1 or k=2) all three algorithms provide a route with a similar expected distance. For larger k values, the greedy algorithm is much worse than AAG and k-EG. For instance, when k=7, the greedy algorithm provides a route with expected length greater than 10 kilometers while AAG and k-EG provide routes with expected length of less than 5 kilometers. The differences are because AAG and k-EG generate a route that goes directly to a near cluster while the route generated by the greedy algorithm does not go directly to a cluster. For Start-Point B, the differences in the quality of the result, between the greedy and the other two algorithms, are even larger. This is because it takes longer for the route of the greedy algorithm to get to a cluster.

Figure 10:
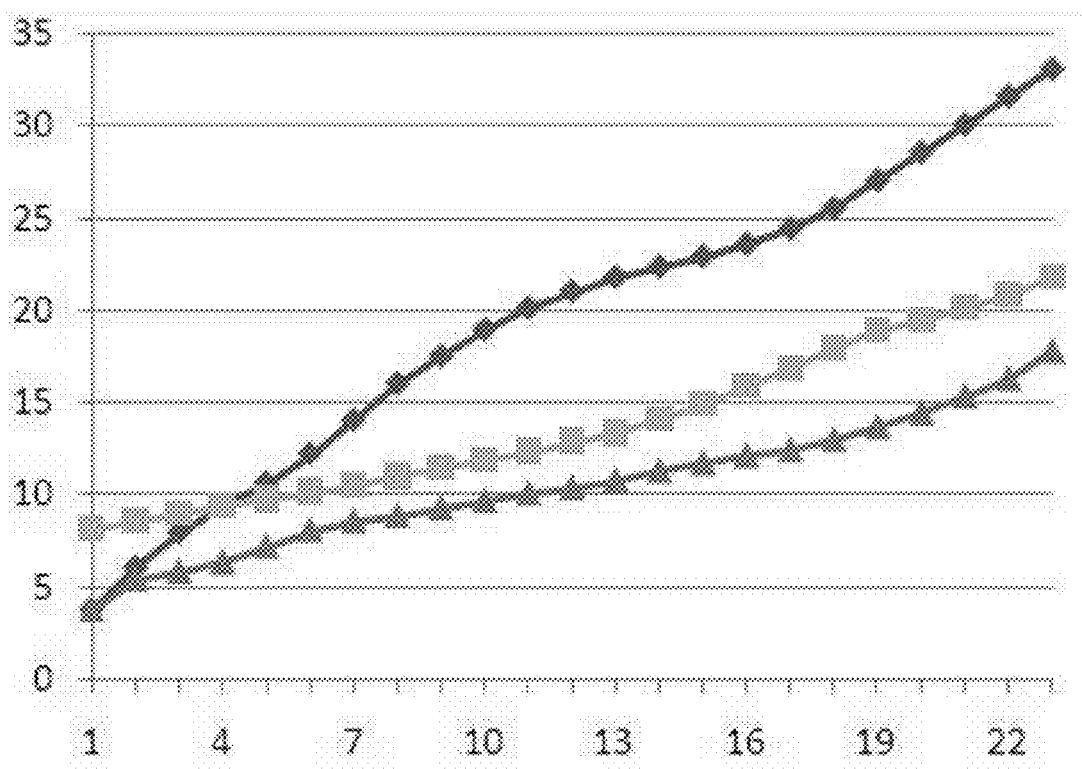
FIG. 10 shows the results of the algorithms of the invention when computing a route over the dataset of FIG. 6, given Starting-Point C.
Figure 11:
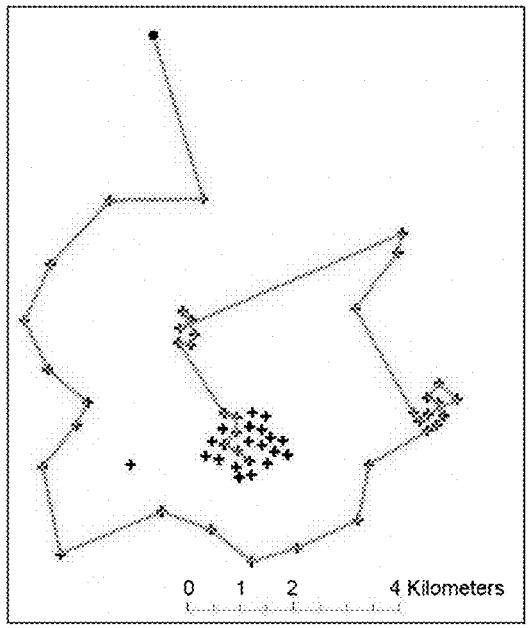
FIG. 11 shows the route by the greedy algorithm on the dataset of FIG. 6 starting at point C.
Figure 12:
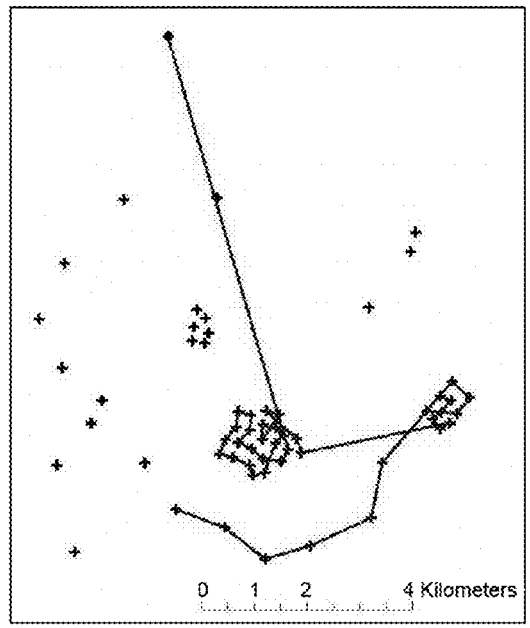
FIG. 12 shows the route by AAG on the dataset of FIG. 6 starting at point C.
Figure 13:
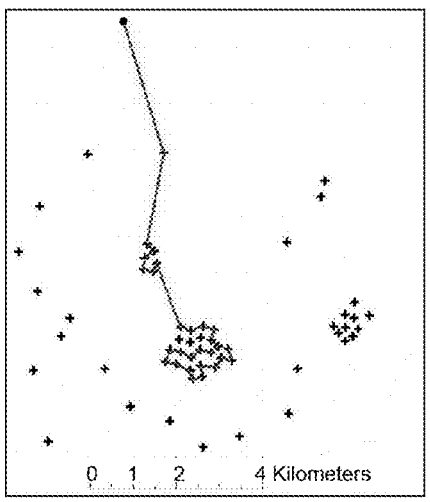
FIG. 13 shows the route by k-EG on the dataset of FIG. 6 starting at point C, for k=7.

FIG. 10 shows the results of our algorithms when computing a route over the dataset of FIG. 6 with respect to Start-Point C. In this case there is a difference between the results provided by AAG and those of k-EG. In order to understand the behavior of the different algorithms in this case, we present the routes that are computed. The greedy algorithm returns the route that is depicted in FIG. 11. The route computed by AAG is shown in FIG. 12. The route that k-EG returns for k=7 is presented in FIG. 13. In these figures it can be seen that the route computed by the greedy algorithm reaches a cluster after a long travel. AAG reaches a cluster directly and thus is better than the greedy algorithm for large k values. The main problems with the route that AAG computes is that it goes directly to a cluster and skips objects that are on the way to the cluster. Going through these objects increases the likelihood to reach k correct object sooner without lengthening the route. Thus, for this case, k-EG provides a better route than AAG.

We conducted several additional tests on synthetic datasets. In these tests we had datasets with a few large clusters, datasets with several small clusters and datasets with no clusters at all. Our experiments confirmed that in the presence of clusters the greedy algorithm is much worse than the other two algorithms, and they showed that k-EG provides the best results in almost all cases.

4.2 Tests on Real-World Data

Figure 7:
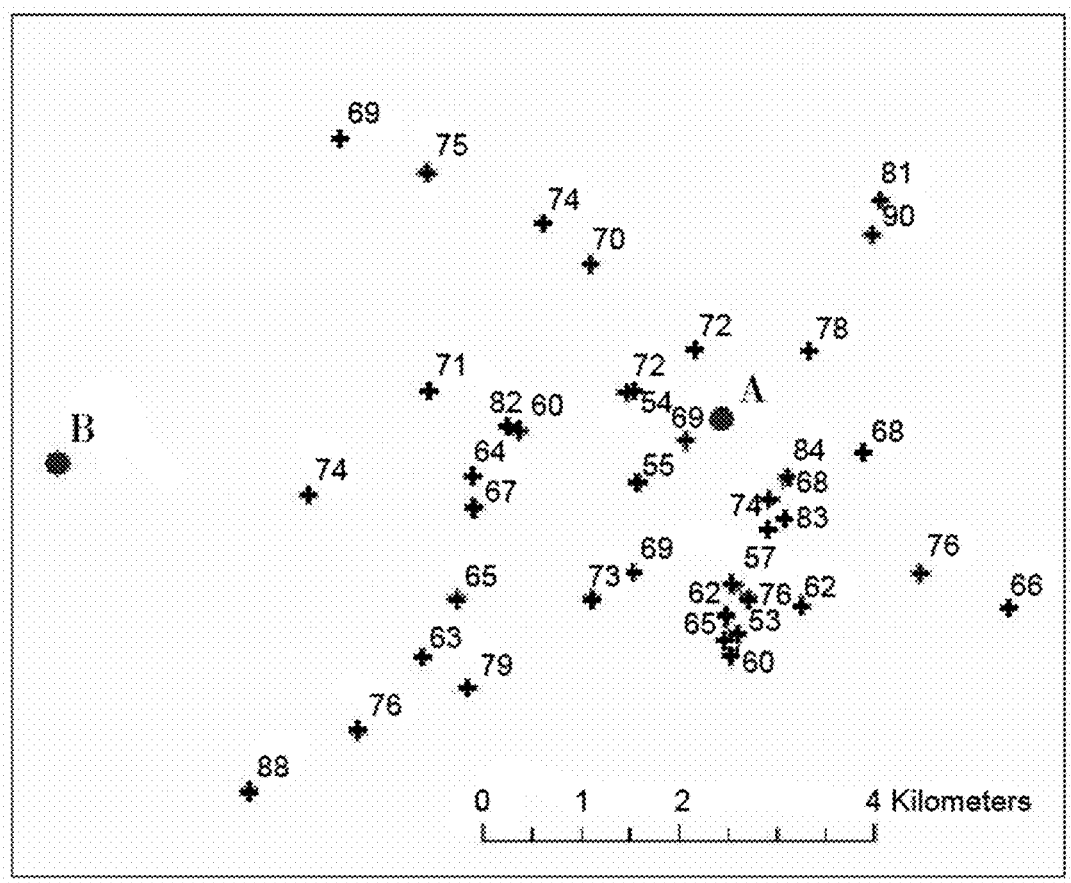
FIG. 7 is a dataset of hotels in Soho, Manhattan.
Figure 14:
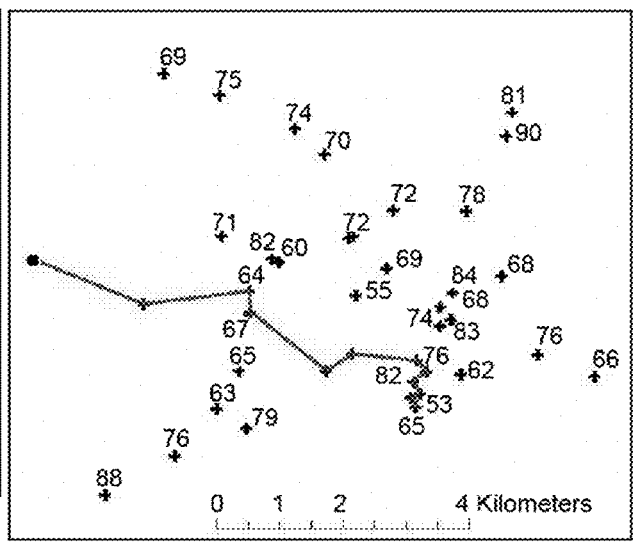
FIG. 14 shows the route by k-EG on the dataset of FIG. 7 starting at point B, for k=7.
Figure 15:
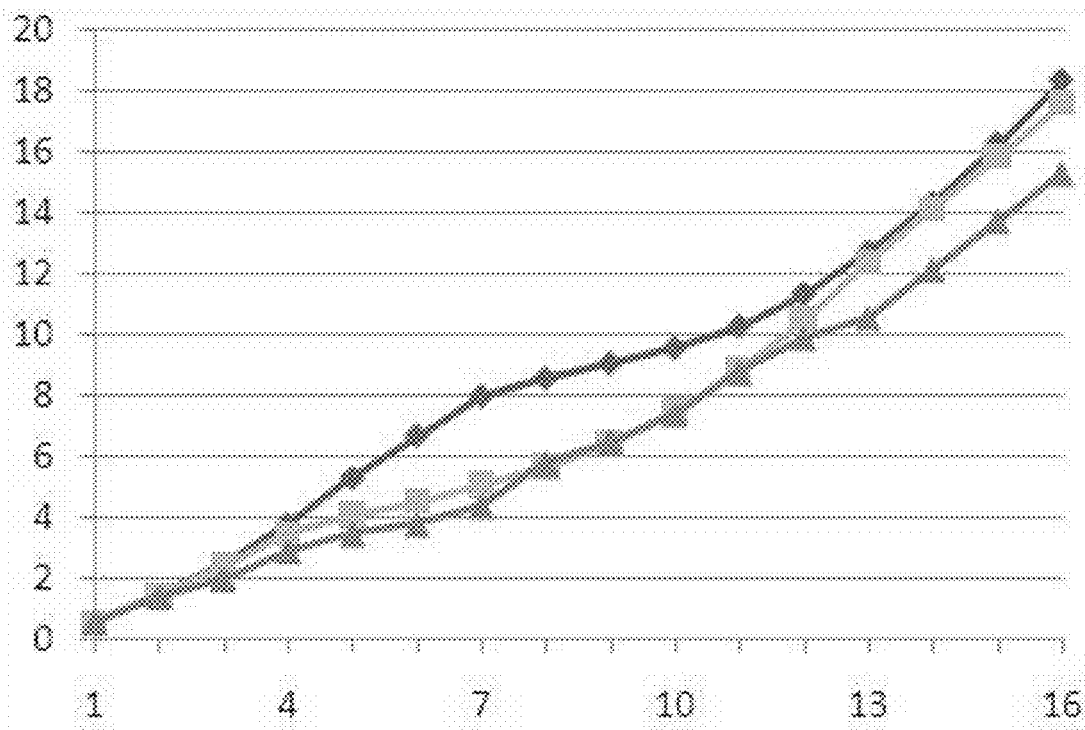
FIG. 15 shows results on real-world dataset, starting at point A.
Figure 16:
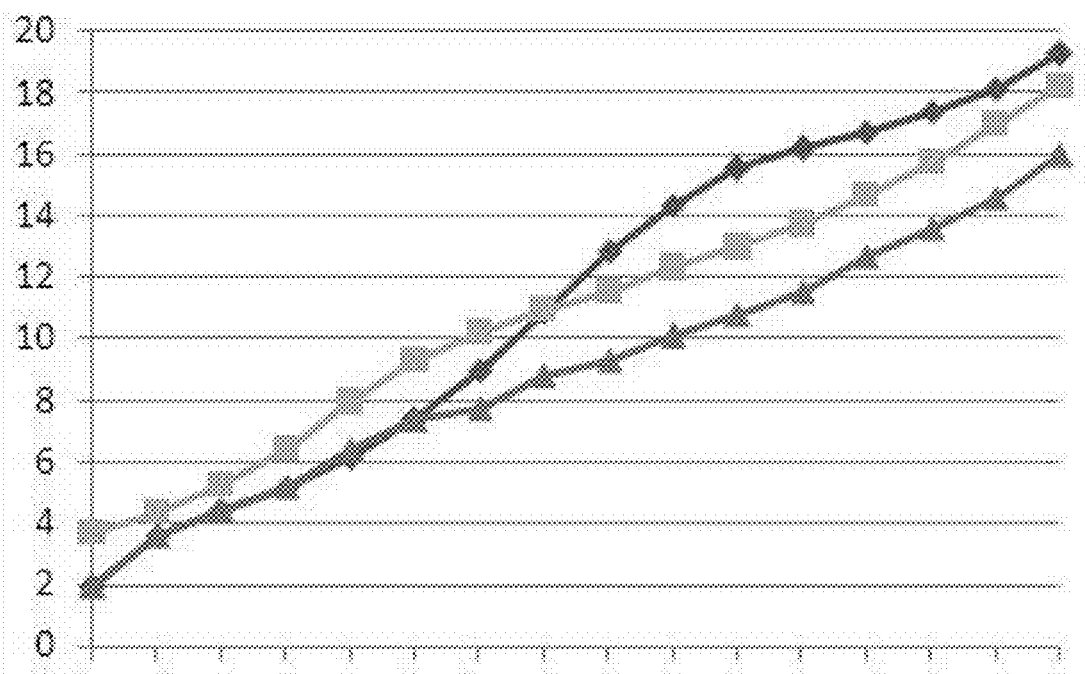
FIG. 16 shows results on real-world dataset, starting at point B.
Figure 17:
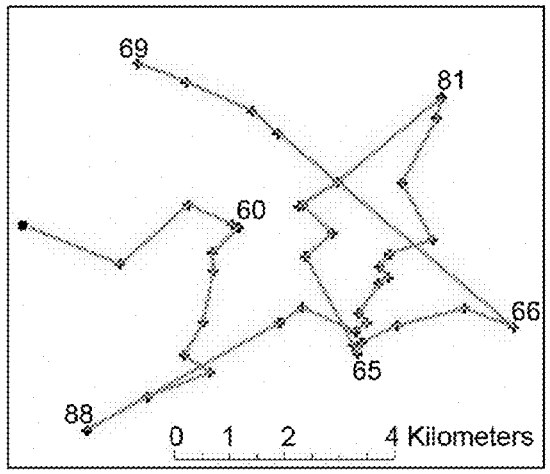
FIG. 17 shows the route by the greedy algorithm on the dataset of FIG. 7, starting at point B.
Figure 18:
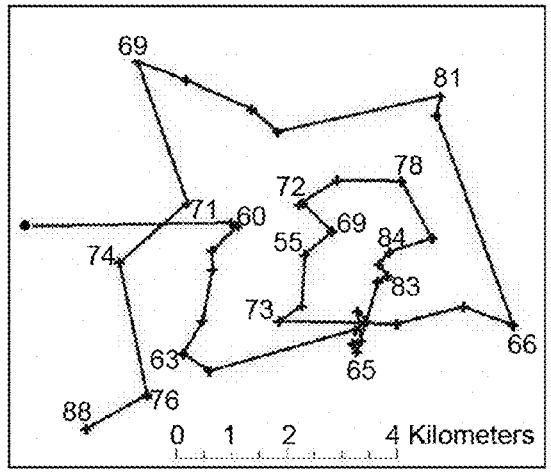
FIG. 18 shows the route by AAG on the dataset of FIG. 7, starting at point B.

We tested our algorithms on several real-world datasets to which we added confidence values. A dataset of hotels in Soho, Manhattan is depicted in FIG. 7. The objects were taken from a map of New-York City and the confidence values were added randomly according to a Gaussian distribution with mean 0.7 and standard deviation 0.1. The results of our algorithms on this dataset are depicted in FIG. 15 and FIG. 16 for two starting points A and B, respectively. In this test, again the greedy algorithm provides the worst route and k-EG provides the best route, for almost all cases. The routes computed by the greedy, AAG and k-EG algorithms are depicted in FIGS. 17, 18 and 14, respectively.

In k-EG, a route is chosen from a set of possible routes. This reduces the number of cases where the algorithm produces an extremely bad route. To show this we conducted experiments over three real-world datasets that are very different one from the other, using two different confidence distributions. One dataset we used is of embassies in Tel- Aviv. In this dataset, almost all the objects are in two clusters that are quite far one from the other. A second dataset is of gas stations in the area of Tel-Aviv. This dataset contains three large clusters (dense urban areas) but also many objects that do not belong to a cluster. A third dataset we used is of points of interest where objects are dispersed without any visible cluster. For each one of these datasets we chose confidence values randomly. First, according to a uniform distribution in the range 0 to 1, and secondly, according to a Gaussian distribution with mean 0.7 and standard deviation 0.1. For each case, we chose a starting location.

Over each dataset, we summarized for AAG and k-EG the quality of the result with respect to the result of the greedy algorithm. To do so, we computed for k=2, . . . , 10 the ratio of the distance of the route produced by the tested algorithm (AAG or k-EG) to the distance of the route produced by the greedy algorithm. We show the minimal and the maximal ratios for these cases in FIG. 19.

Figure 19:
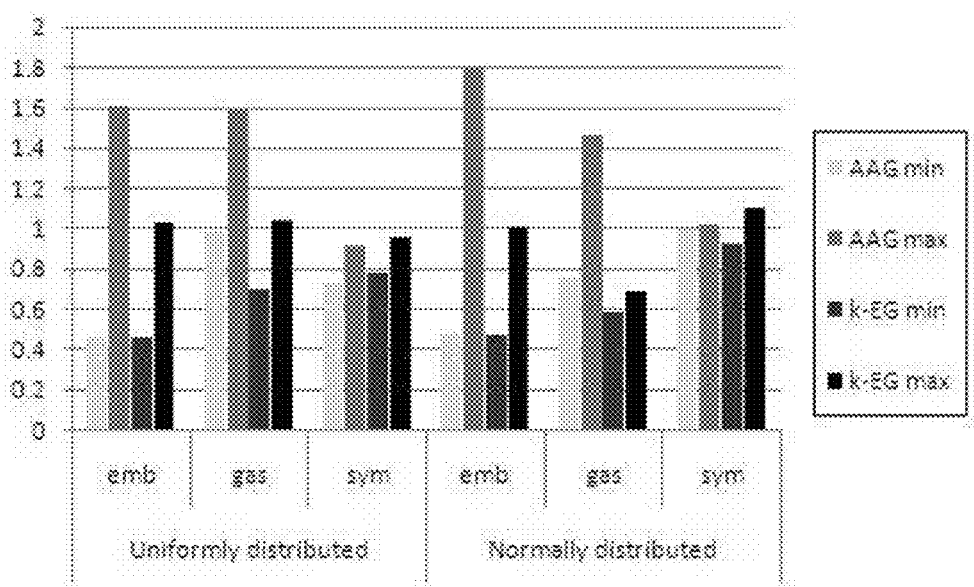
FIG. 19 shows the results of the algorithms of the invention summed up for several real-world sources.

The graph in FIG. 19 shows that AAG sometimes generates a route that is much worse than the route the greedy algorithm would produce. This is because in the presence of clusters the route generated by AAG goes directly to a cluster even when all the clusters are far from the starting point. This approach can be expensive, especially for small k values. In the presence of clusters, both AAG and k-EG sometimes produce a route that is much better than the route produced by the greedy algorithm. Not surprisingly, when there are no clusters, the differences between the algorithms are smaller.

Note that for different distributions of confidence values we get similar results, however, an increase in the variance of confidence values leads to an increase in the difference between the smallest ratio and the largest ratio.

4.3 Runtimes

Figure 20:
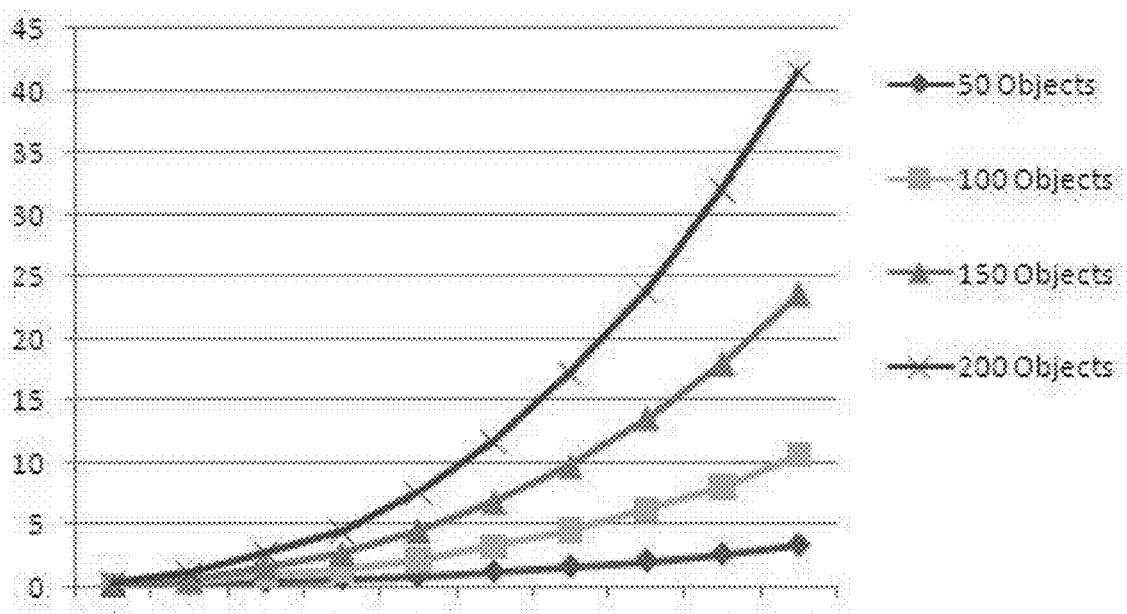
FIG. 20 shows the runtimes (in seconds) of k-EG as a function of k, on dataset of different sizes.

We consider now the time it takes for computing a route using our algorithms. To give runtime estimations, we measured the computation of a route on datasets of different sizes. When measuring the times, we used a PC with Core 2 Duo 2.13 GHz processor (E6400) and 2 GB of main memory. In Table 1 we show the time it takes for computing, using the greedy algorithm or AAG, a route over four datasets with 50, 100, 150 and 200 objects. For AAG we show both the time it takes for computing adjacency-aware values in the preprocessing part of the method, and the time it takes for computing a route after the preprocessing has been completed. For k-EG, we present in FIG. 20 the times for computing a route, as a function of k. Table 1 and FIG. 20 show that the greedy algorithm is the most efficient among the three algorithms while k-EG is less efficient than the other two methods. AAG is less efficient than the greedy algorithm when considering the preprocessing time in the measure, however, without the preprocessing, AAG is as efficient as the greedy algorithm.

TABLE 1

The time for computing a route over datasets of different sizes.

|  | 50 objects | 100 objects | 150 objects | 200 objects |
| --- | --- | --- | --- | --- |
| Greedy | <0.01 sec | 0.02 sec | 0.02 sec | 0.02 sec |
| AAG preprocessing | 0.02 sec | 0.03 sec | 0.08 sec | 0.13 sec |
| AAG compute route | <0.01 sec | <0.01 sec | 0.02 sec | 0.02 sec |

Experiments Regarding Route-Search Queries

We tested our algorithms on both synthetically-generated datasets and real-world datasets. Our goal was to compare the efficiency and the effectiveness of our algorithms, for different queries and over various datasets. The experiments were conducted on a PC equipped with a Core 2 Duo processor 2.13 GHz (E6400), 2 GB of main memory and Windows XP Professional operating system.

4.4 Real-World Test

Figure 25:
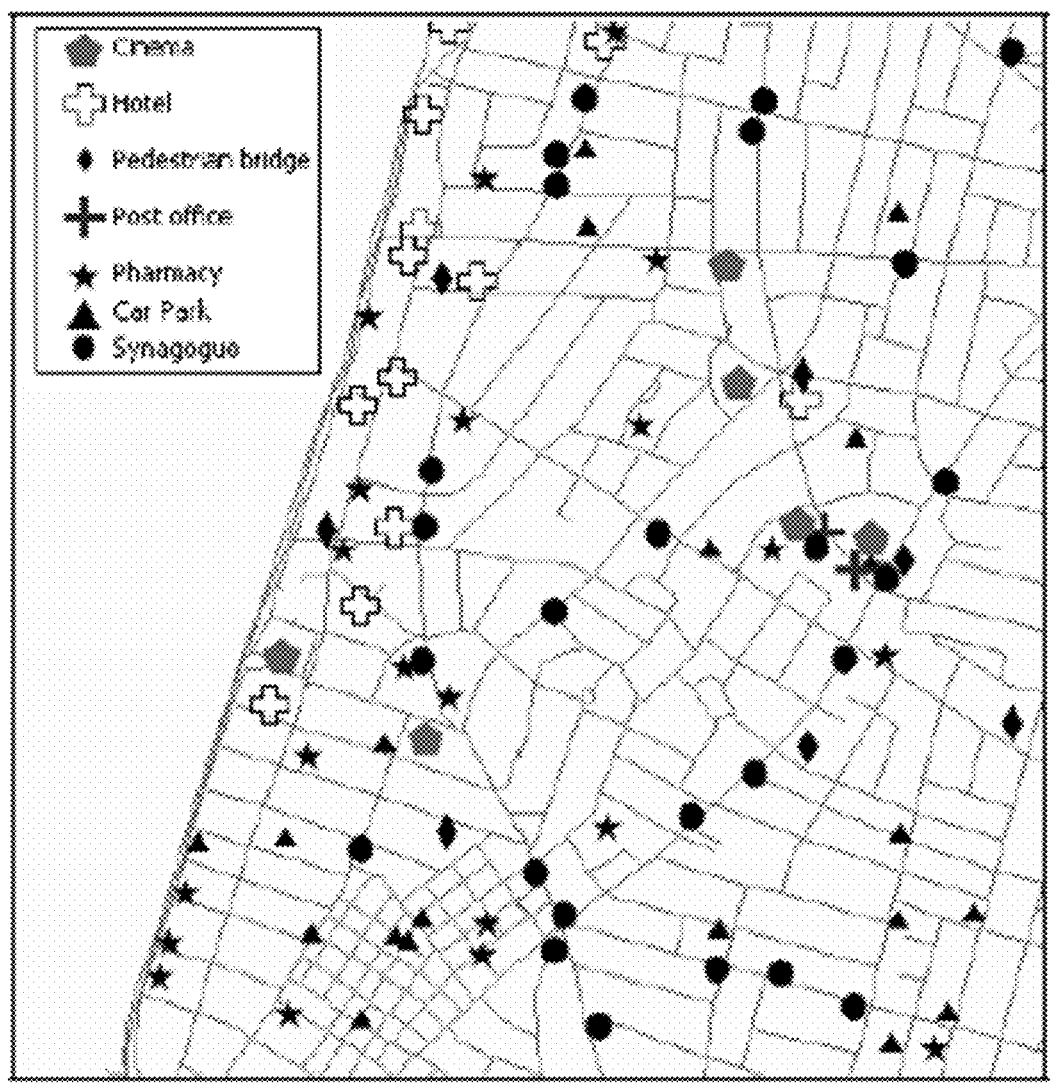
FIG. 25 shows a map of Tel-Aviv (fragment).

The real-world data that we used in our experiments is part of a digital map of the city Tel-Aviv that has been generated by Mapa® (a registered trademark of Mapa Internet from Tel-Aviv, Israel) available at www.mapa.co.il. A fragment of that map is presented in FIG. 25. In our tests, we used the "Point Of Interest" (POI) layer of the map. The objects in this layer represent many different types of geographical entities. We extracted from the map 628 objects of seven different types (20 cinemas, 29 hotels, 31 pedestrian bridges, 54 post offices, 136 pharmacies, 169 parking lots and 189 synagogues). That is, in the tests we had k=7. These objects received scores that are normally distributed, with mean of 69.7 percent and a standard deviation of 9.98 percent.

In our experiments we examined three cases of locations of the source s and the destination t. Case A: The source and the destination are the same location. Case B: There is a medium distance between s and t. Case C: There is a large distance between s and t, i.e., each location is in a different corner of the map.

Table 2 shows the results of the three SR algorithms over the Tel-Aviv dataset. The results are presented for Case B (the distance between s and t is neither small nor large). For Case A and Case C the algorithms provide similar results. The test results support our analysis. They show that the route provided by IFH is shorter than the routes of the other two methods. The route of GExt is the longest among the three routes. As for the running times, GExt is the most efficient and GIns is the least efficient.

TABLE 2

The length of the result route and the running time of the algorithms for SR, when evaluated over the Tel-Aviv dataset.

|  | GExt | GIns | IFH |
| --- | --- | --- | --- |
| Length (meters) | 7068 | 4666 | 4503 |
| Time (milliseconds) | 1 | 5 | 3 |

Figures 26A, 26B, 26C:
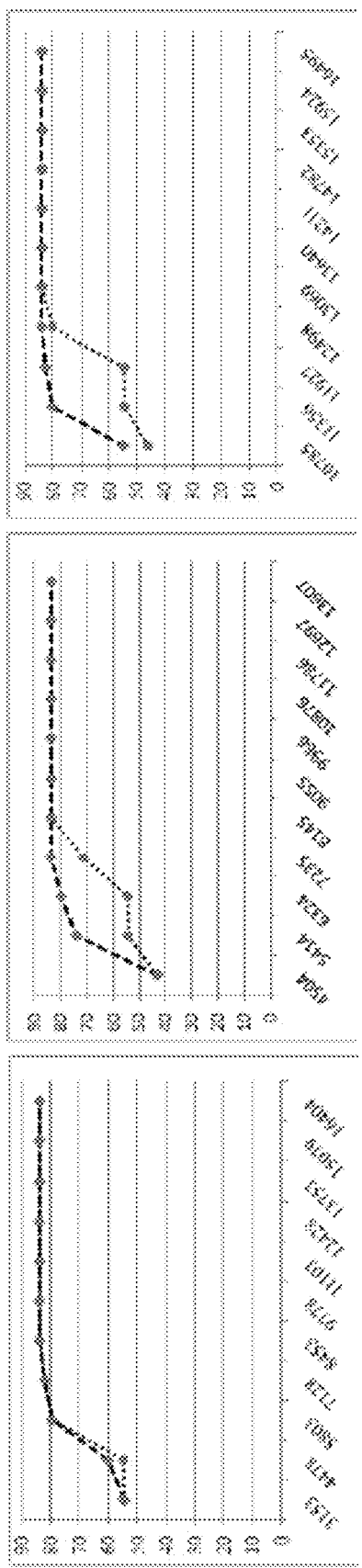
FIGS. 26A-C are graphs showing the highest minimal score (percent) of the routes constructed by RMHR (dark dashed line) and ASA (light dotted line) as a function of the distance limit t, over the data of FIG. 25.

In FIGS. 26, 27 and 28, we present the results of experimenting with RMHR and ASA over the Tel-Aviv dataset, when computing the most-reliable route. FIG. 26 presents the minimal scores of routes computed by RMHR and ASA, for different values of the distance limit l. The results show that in all circumstances RMHR computes better routes than ASA. When the distance bound l is increased, the results of ASA are improved, and eventually become as good as the results of RMHR.

FIG. 27 presents the running times of RMHR and ASA as a function of the distance limit l. In most cases, RMHR is more efficient than ASA. However, when l is small, ASA is faster. This is because for a small t, the number of iterations that ASA performs is small, whereas RMHR needs many iteration to complete its task. When l is not small, ASA performs many iterations, so RMHR finds a route faster. FIG. 28 shows that when l is small, the route computed by RMHR is shorter than the route computed by ASA. When l is large, ASA computes the shorter route.

4.5 Tests on Synthetic Data

Testing our algorithms over synthetic data allows us to examine the algorithms over datasets with specific, sometimes extreme, properties. In a synthetic dataset we have control over the distribution of the locations of objects in the area of the map, the way that the objects are partitioned into sets, etc. For generating the synthetic datasets, we implemented a random-dataset generator. Our generator is a two-step process. First, the objects are generated. The locations of the objects are randomly chosen according to a given distribution, in a square area. In the second step, we partition the objects into sets and a confidence value is attached to each object. The partitioning of objects into sets can be uniform or according to a distribution specified by the user.

The user provides the following parameters to the dataset generator: the number of objects, the size of the square area in which the objects are located and the minimal distance between objects. For simulating search results, the user provides the distribution of scores, the distribution of the size of the sets in the partition. These parameters allow a user to generate tests with different sizes of datasets and different partitions of the datasets into sets.

In Table 3 we present the results of experiments with the SR algorithms over synthetic datasets, one containing 10,000 objects and the other containing 100,000 objects. These tests illustrate the efficiency of our algorithms and they provide another evidence that IFH provides better results than the other two algorithms.

TABLE 3

The length of the result route (meters) and the running time (milliseconds) of the algorithms for SR, when evaluated over a synthetic dataset of size 10,000 and a synthetic dataset of size 100,000

| | 10,000 | | | 100,000 | | |
|---|---|---|---|---|---|---|
| | GExt | GIns | IFH | GExt | GIns | IFH |
| Length | 537 | 466 | 437 | 688 | 521 | 511 |
| Time | 23 | 109 | 62 | 234 | 773 | 652 |

In order to compare the efficiency of RMHR and ASA, we present in Table 4 their running times over datasets with various sizes. The table presents the mean of many runs using different distance limits. The standard deviation is also presented. The results show that RMHR is much more efficient than ASA. Moreover, having a small standard deviation shows that RMHR is efficient in almost all the cases. ASA, for comparison, has a large standard deviation because it is efficient in some cases and not efficient in others.

TABLE 4

Running times (milliseconds) of RMHR and ASA, over datasets with various sizes. For s and t holds Case B.

| | RMHR | | ASA | |
|---|---|---|---|---|
| | mean | σ | mean | σ |
| 1,000 objects | 10 | 16 | 9 | 5 |
| 10,000 objects | 16 | 7 | 267 | 154 |
| 100,000 objects | 149 | 2 | 2714 | 1243 |

Figure 29B:
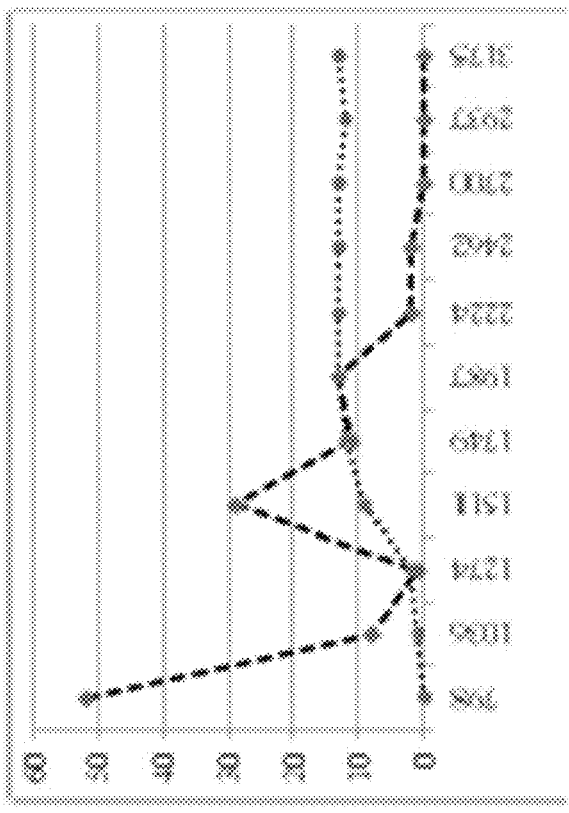
FIGS. 29A-B are graphs showing Running times of RMHR and ASA as a function of t, when the partitioning of the dataset is to even sets (FIG. 29A) or uneven sets (FIG. 29B).
Figure 29A:
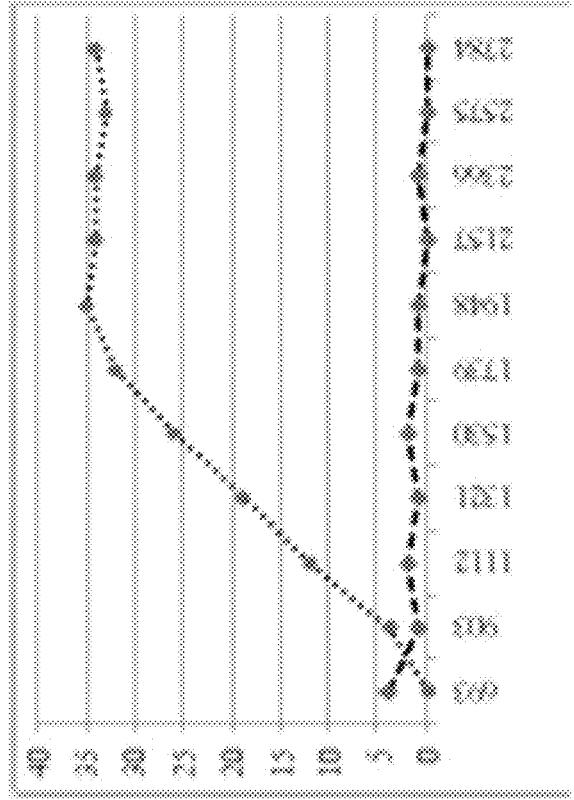

FIG. 29 illustrates the effect of the partitioning into sets on the running times of RMHR and ASA (the size of the dataset is 1,000 objects). When the partitioning is into sets of approximately equal size, i.e., every two sets among $A_1, \ldots, A_n$ have a similar size, then RMHR is very efficient and ASA is not efficient (FIG. 29A). When the partitioning is uneven, then the efficiency of RMHR decreases while the efficiency of ASA increases (FIG. 29B). To see why this happens consider the case where some set $A_i$ is small. When ASA tries to improve a route by replacing an element of $A_i$, it quickly fails and stops. So having a small set increases the efficiency of ASA. For RMHR, it adds objects to the set over which it works according to their score. So, when $A_i$ is small, RMHR will add objects of $A_i$ to the working set at a low rate (for each objects of $A_i$ added to the set, many objects of other sets will be added). Consequently, the computation will be slower.

5 Related Work

With the ongoing advances in the areas of wireless communication and positioning technologies, it has become possible to provide mobile, location-based services. These services may track the movements and requests of their customers in multidimensional data warehouses, and later use this information for answering complex queries [C. S. Jensen, A. Kligys, T. B. Pedersen, and I. Timko. Multidimensional data modeling for location-based services. *The VLDB Journal*, 13(1):1-21, 2004].

Data models for location-based services have been developed and implemented in recent years. An R-tree-based technique for indexing data about the current positions of objects in highly dynamic databases has been proposed by Saltenis and Jensen [S. Saltenis and C. S. Jensen. Indexing of moving objects for location-based services. In *Proceedings of the 18th International Conference on Data Engineering*, Washington D.C. (USA), 2002]. An efficient search for specific information over multiple collections has been described by Goodchild and Zhou [M. F. Goodchild and J. Zhou. Finding geographic information: Collection-level metadata. *Geoinformatica*, 7(2):95-112, 2003], who have also reported on several conceptual designs for a searching process that is based on collection-level metadata (CLM). Miller and Shaw [H. J Miller and S. Shih-Lung. *Geographic Information Systems for Transportation: Principles and Applications (Spatial Information Systems)*. Oxford University Press, 2001] have described the use of GIS-T data models and different aspects of path finding in geospatial systems for transportation purposes.

Manipulating uncertain and probabilistic data has received a lot of attention recently. Several papers deal with managing probabilistic and uncertain data, and propose models for representing the data [D. Barbara, H. Garcia-Molina, and D. Poter. The management of probabilistic data. *IEEE Transaction on Knowledge and Data Engineering*, 4(5):487-502, 1992; R. Cavallo and M. Pittarelli. The theory of probabilistic databases. In *Proceedings of 13th International Conference on Very Large Data Bases*, 1987, N. Fuhr. A probabilistic framework for vague queries and imprecise information in databases. In *Proc. of the 16th International Conference on Very Large Data Bases*, 1990; L. V. S. Lakshmanan, N. Leone, R. Ross, and V. S. Subrahmanian. Probview: A flexible probabilistic database system. *ACM Trans. on Database Systems*, 22(3):419-469, 1997]. In some papers, the problem of querying probabilistic data is considered and various techniques for efficient evaluation of queries over probabilistic data are proposed [R. Cheng, D. Kalashnikov, and S. Parbhakar. Evaluating probabilistic queries over imprecise data. In *Proc. of ACM SIGMOD International Conference on Management of Data*, 2003; N. N. Dalvi and D. Suciu. Efficient query evaluation on probabilistic databases. In *Proceedings of the 30th International Conference on Very Large Data Bases*, 2004; M. Pittarelli. An algebra for probabilistic databases. IEEE Transactions on Knowledge and Data Engineering, 6(2):293-303, 1994; R. Ross, V. S. Subrahmanian, and J. Grant. Aggregate operators in probabilistic databases. Journal of the ACM, 52(1):54-101, 2005; E. Zimnyi. Query evaluation in probabilistic relational databases. Theoretical Computer Science, 171(1-2): 179-219, 1997]. The above papers are concerned with probabilistic data in general, and not with spatial data. For probabilistic spatial data, the problem of computing a join of spatial polygonal-shaped objects with imprecise locations is investigated in [J. Ni, C. V. Ravishankar, and B. Bhanu. Probabilistic spatial database operations. In *Proc. of the 8th International Symposium on Advances in Spatial and Temporal Databases,* 2003]. Computing nearest-neighbor on probabilistic spatial databases is discussed in [S. Zhang. A nearest neighborhood algebra for probabilistic databases. *Intelligent Data Analysis,* 4(1):29-49, 2000]. Probabilistic spatial data has also been considered in the context of dealing with moving objects [S. Saltenis and C. S. Jensen. Indexing of moving objects for location-based services. In Proceedings of the 18th International Conference on Data Engineering, Washington D.C. (USA), 2002; G. Trajcevski, O. Wolfson, K. Hinrichs, and S. Chamberlain. Managing uncertainty in moving objects databases. *ACM Transactions on Database Systems,* 29(3):463-507, 2004; G. Trajcevski, O. Wolfson, F. Zhang, and S. Chamberlain. The geometry of uncertainty in moving objects databases. In *Proceedings of the 8th International Conference on Extending Database Technology,* 2002]. All these problems are different from the present invention, namely, finding an efficient and effective k-route.

Although the invention has been described in detail, nevertheless changes and modifications, which do not depart from the teachings of the present invention, will be evident to those skilled in the art. Such changes and modifications are deemed to come within the purview of the present invention and the appended claims.

What is claimed is:

1. A computerized method for finding an efficient k-route over uncertain geo-spatial datasets, said method comprising the steps of:
   (i) identifying a geo-spatial object from among a plurality of geo-spatial objects contained in the uncertain geo-spatial datasets that has the best ratio of confidence to distance among the geo-spatial objects that have not yet been added to a k-route in previous iterations, the k-route being a path that traverses the geo-spatial objects starting at a given location and stopping after visiting a number of k correct objects, each geo-spatial object having a location, the uncertain geo-spatial datasets containing a confidence value and one or more spatial or non-spatial attributes;
   (ii) adding the object identified in step (i) to said k-route; and
   (iii) repeating steps (i) to (ii) until the sum of the confidences of the objects in the route reaches a value k, wherein said steps are carried out using at least one computer processing unit, and
   wherein k is at least 1.

2. The method according to claim 1, wherein k equals 1.

3. The method according to claim 1, further comprising the step of assigning an adjacency-aware value to each geo-spatial object.

4. The method according to claim 3, wherein said adjacency-aware values are based on the distance of an object from other objects in the dataset, the confidence value of the object and the configuration of the objects.

5. The method according to claim 1, further comprising the steps of:
   (i) first creating sets from each object in the dataset;
   (ii) applying steps (i) to (iii) of claim 1 on each created set; and
   (iii) choosing the set that generates the shortest route.

6. The method according to claim 1, wherein k is not known when computing the k-route.

7. The method according to claim 1, wherein a user reports the correctness of each visited object, and the k-route is re-computed accordingly.

8. The method according to claim 1, wherein the k-route is computed incrementally, such that each time a user is provided only with the next geo-spatial object.

9. A non-transitory computer-readable medium encoded with a program module that finds an efficient and effective k-route over uncertain geo-spatial datasets, by:
   (i) identifying a geo-spatial object from among a plurality of geo-spatial objects contained in the uncertain geo-spatial datasets that has the best ratio of confidence to distance among the geo-spatial objects that have not yet been added to a k-route in previous iterations, the k-route being a path that traverses the geo-spatial objects starting at a given location and stopping after visiting a number of k correct objects, each geo-spatial object having a location, the uncertain geo-spatial datasets containing a confidence value and one or more spatial or non-spatial attributes;
   (ii) adding the object identified in step (i) to said k-route; and
   (iii) repeating steps (i) to (ii) until the sum of the confidences of the objects in the route reaches a value k, which is at least 1.

10. The non-transitory computer-readable medium according to claim 9, further comprising the steps of:
    (iv) first creating sets from each object in the dataset;
    (v) applying steps (i) to (iii) of claim 9 on each created set; and
    (vi) choosing the set that generates the shortest route.

* * * * *